US009116491B2

(12) United States Patent
Murakata

(10) Patent No.: US 9,116,491 B2
(45) Date of Patent: Aug. 25, 2015

(54) IMAGE FORMING METHOD AND APPARATUS CONFIGURED TO CORRECT IMAGE GRADATION

(71) Applicant: Akira Murakata, Tokyo (JP)

(72) Inventor: Akira Murakata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 13/917,755

(22) Filed: Jun. 14, 2013

(65) Prior Publication Data

US 2014/0029020 A1 Jan. 30, 2014

(30) Foreign Application Priority Data

Jul. 30, 2012 (JP) ................................. 2012-168506

(51) Int. Cl.
*H04N 1/46* (2006.01)
*G03G 15/00* (2006.01)

(52) U.S. Cl.
CPC .......... *G03G 15/556* (2013.01); *G03G 15/5058* (2013.01); *G03G 15/5062* (2013.01)

(58) Field of Classification Search
None
See application file for complete search history.

(56) References Cited

U.S. PATENT DOCUMENTS

| | | | |
|---|---|---|---|
| 6,055,071 A * | 4/2000 | Kuwata et al. | 358/501 |
| 6,185,007 B1 * | 2/2001 | Hayashi et al. | 358/1.9 |
| 6,243,542 B1 * | 6/2001 | Fujimoto et al. | 399/49 |
| 7,652,790 B2 * | 1/2010 | Touura | 358/1.9 |
| 8,059,318 B2 * | 11/2011 | Maebashi et al. | 358/504 |
| 8,107,837 B2 * | 1/2012 | Hirai | 399/49 |
| 8,294,954 B2 | 10/2012 | Murakata | |
| 8,422,088 B2 | 4/2013 | Murakata | |
| 8,422,811 B2 | 4/2013 | Murakata | |
| 8,455,851 B2 * | 6/2013 | Tanaka et al. | 250/559.16 |
| 8,503,895 B2 * | 8/2013 | Hirai | 399/49 |
| 8,638,481 B2 * | 1/2014 | Miyadera et al. | 358/518 |
| 8,797,600 B2 * | 8/2014 | Harashima et al. | 358/3.21 |
| 2003/0091357 A1 * | 5/2003 | Maebashi et al. | 399/49 |
| 2007/0064267 A1 | 3/2007 | Murakata et al. | |
| 2008/0165375 A1 | 7/2008 | Murakata | |
| 2008/0231912 A1 | 9/2008 | Murakata | |
| 2011/0032579 A1 | 2/2011 | Murakata | |
| 2011/0063683 A1 | 3/2011 | Kaneko et al. | |

FOREIGN PATENT DOCUMENTS

| | | |
|---|---|---|
| JP | 2011-081023 | 4/2011 |

* cited by examiner

*Primary Examiner* — Dung Tran
(74) *Attorney, Agent, or Firm* — Harness, Dickey & Pierce, P.L.C.

(57) ABSTRACT

An image forming apparatus is disclosed that corrects a gradation of an image to be formed by detecting a gradation pattern. The image forming apparatus includes an image forming unit that transfers a correction toner image corresponding to the gradation pattern on a surface of an intermediate transfer medium and forms a correction image corresponding to the gradation pattern on a surface of a recording medium, a detection unit that detects the correction toner image and the correction image, and an image processing unit that corrects the gradation based on the detected correction toner image and the detected correction image.

8 Claims, 14 Drawing Sheets

IMAGE FORMING METHOD AND APPARATUS CONFIGURED TO CORRECT IMAGE GRADATION

BACKGROUND OF THE INVENTION

1. Field of the Invention

The disclosures herein generally relate to an image forming apparatus and an image forming method.

2. Description of the Related Art

There are image forming apparatuses that are configured to control the gradation (e.g., intensity degree of colors) of an image to be formed in order to improve image quality. For example, Japanese Laid-Open Patent Publication No. 2011-81023 (Patent Document 1) discloses an image forming apparatus that forms a calibration pattern (area gradation pattern) on the surface of a transfer medium (e.g., intermediate transfer belt, photoconductor drum) and corrects the gradation of an image based on the pattern formed.

However, the transfer medium of an image forming apparatus may be prone to time degradation from continued use. Thus, in order to improve the image quality of an image to be formed on the surface of a recording medium, gradation correction of an image should be performed based on an image (pattern) formed on the surface of a recording medium.

A technique for correcting the gradation of an image to be formed based on a pattern formed on the surface of a recording medium is not disclosed in the prior art.

SUMMARY OF THE INVENTION

It is a general object of at least one embodiment of the present invention to provide an image forming apparatus and an image forming method that substantially obviate one or more problems caused by the limitations and disadvantages of the related art. It is one specific object of at least one embodiment of the present invention to provide an image forming apparatus that corrects the gradation of an image to be formed based on an image of a gradation pattern transferred on the surface of an intermediate transfer medium and an image of a gradation pattern formed on the surface of a recording medium.

According to one embodiment of the present invention, an image forming apparatus is provided that corrects a gradation of an image to be formed by detecting a gradation pattern. The image forming apparatus includes an image forming unit that transfers a correction toner image corresponding to the gradation pattern on a surface of an intermediate transfer medium and forms a correction image corresponding to the gradation pattern on a surface of a recording medium, a detection unit that detects the correction toner image and the correction image, and an image processing unit that corrects the gradation based on the detected correction toner image and the detected correction image.

According to one aspect of the present invention, the gradation of an image to be formed may be corrected based on an image of a gradation pattern transferred on the surface of an intermediate transfer medium and an image of a gradation pattern formed on the surface of a recording medium.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention are described with reference to the accompanying drawings.

It is noted that various aspects of the present invention are described below through illustrations of an image forming apparatus that calibrates (e.g., corrects, adjusts) the gradation of an image to be formed by detecting a pattern (e.g., calibration pattern, area gradation pattern) formed on the surface of a transfer medium and a pattern formed on the surface of a recording medium.

However, the present invention is not limited to implementation in an image forming apparatus, but may also be implemented in other various types of apparatuses that form an image on a recording medium including a copier, a recording apparatus, a printer, a scanner, and a facsimile machine, for example. Also, the recording medium used by the image forming apparatus to form an image may be any type of medium having a surface that can support an image including normal paper, high quality paper, thin paper, heavy paper, recording paper, coated paper, an OHP (overhead projector) sheet, a synthetic resin film, and other various types of media.

(Image Forming Apparatus Configuration)

In the following, a configuration of an image forming apparatus 100 according to an embodiment of the present invention is described with reference to FIG. 1.

Figure 1:
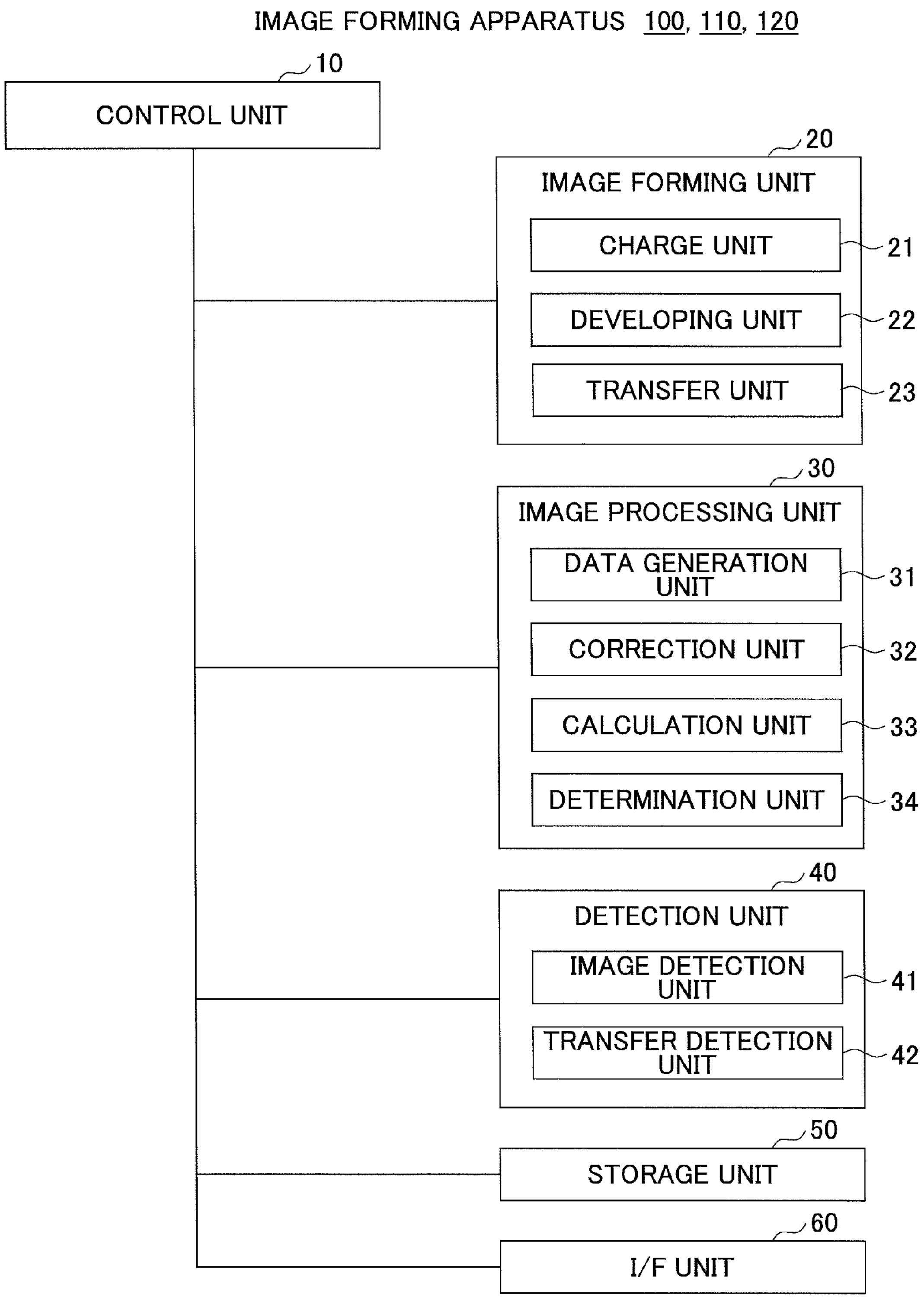
FIG. 1 illustrates an exemplary configuration of an image forming apparatus according to an embodiment of the present invention.

As illustrated in FIG. 1, the image forming apparatus 100 includes a control unit 10 that controls operations of the image forming apparatus 100, an image forming unit 20 that forms an image on a recording medium, an image processing unit 30 that processes an image to be formed on the recording medium, and a detection unit 40 that detects the image formed by the image forming unit 20. The image forming apparatus 100 also includes a storage unit 50 that stores programs for controlling operations of the image forming apparatus 100 and various data such as processing results of the image processing unit 30 and detection results of the detection unit 40. The image forming apparatus 100 further includes an interface (I/F) unit 60 for inputting information from the exterior and outputting information to the exterior of the image forming apparatus 100.

According to an aspect of the present embodiment, the image forming apparatus 100 may correct (perform intensity control, adjustment, process, etc.) an image to be formed upon image formation based on detection results of detecting an image of a gradation pattern (referred to as "gradation pattern Pg" hereinafter) transferred on the surface of an intermediate transfer medium and an image of the gradation pattern Pg formed on the surface of a recording medium upon calibration. According to another aspect of the present embodiment, in a case where an image corresponding to the gradation pattern Pg formed on the surface of a recording medium (correction image) is detected, the image forming apparatus 100 may correct an image to be formed upon image formation based on the detected image. According to another aspect of the present embodiment, the image forming apparatus 100 may initialize a detection result of a toner image corresponding to the gradation pattern Pg (correction toner image).

It is noted that in the following descriptions, initialization of a detection result means not using the corresponding detection result (detection result to be initialized) upon performing gradation correction of an image to be formed (calculating a correction value).

The control unit 10 is configured to direct and control the operations of the various units of the image forming apparatus 100. The control unit 10 may use programs (e.g., control programs, applications) stored in the storage unit 50, for example, to control operations of various units such as the image forming unit 20. Also, the control unit 10 may control operations of various units such as the image forming unit 20 based on information input via the I/F unit 60. Further, the control unit 10 may output information relating to the image forming apparatus 100 (e.g., operation information, processing information, detection results) via the I/F unit 60 (e.g., output unit, display unit).

The control unit 10 of the present embodiment is configured to control the operations of the image forming unit 20 for forming an image on a recording medium. Also, the control unit 10 of the present embodiment is configured to control the operations of the image processing unit 30 for processing an image to be formed on the recording medium. Further, the control unit 10 of the present embodiment is configured to control the operations of the detection unit 40 for detecting (scanning) an image (e.g., pattern).

In one embodiment, the control unit 10 may include a storage unit (not shown) for storing information. Also, the control unit 10 may use the storage unit to (temporarily) store programs and operation conditions necessary for controlling the operations of the image forming apparatus 100.

The image forming unit 20 is configured to form an image on the surface of a recording medium. The image forming unit 20 includes a charge unit 21, a developing unit 22, and a transfer unit 23. The charge unit 21 may include an exposure unit and is configured to electrostatically charge the surface of an image carrier to generate an electrostatic latent image. The developing unit 22 is configured to develop the generated electrostatic latent image into a toner image. The transfer unit 23 is configured to transfer the toner image developed by the developing unit 22 onto an intermediate transfer medium and then transfer the toner image on the intermediate transfer medium onto the surface of a recording medium.

It is noted that although the image forming unit 20 of the present embodiment uses an intermediate transfer belt as the intermediate transfer medium, the intermediate transfer medium used in the present invention is not limited to an intermediate transfer belt. Also, the image forming unit 20 may additionally include a fixing unit for fixing the image (toner image) transferred onto the recording medium and a cleaning unit for cleaning (and neutralizing) the surface of an image carrier after image formation, for example.

The image forming unit 20 of the present embodiment is configured to use the charge unit 21 to electrostatically charge the surface of the image carrier (e.g., photoconductor drum) based on image data input from the image processing unit 30, which is described below. Also, the image forming unit 20 of the present embodiment is configured to use the charge unit 21 to generate an electrostatic latent image on the surface of the image carrier.

Also, the image forming unit 20 is configured to use the developing unit 22 to develop a toner image corresponding to the electrostatic latent image formed on the surface of the image carrier. Also, the image forming unit 20 is configured to use the transfer unit 23 to transfer the toner image onto a recording medium via an intermediate transfer medium. That is, the image forming unit 20 is configured to form an image on the surface of a recording medium using the charge unit 21, the developing unit 22, and the transfer unit 23.

Further, the image forming unit 20 of the present embodiment is configured to form a correction toner image corresponding to the gradation pattern Pg and a correction image corresponding to the gradation pattern Pg upon calibration (upon performing image gradation correction such as gamma correction).

Specifically, the image forming unit 20 uses the charge unit 21 to generate an electrostatic latent image corresponding to the gradation pattern Pg. For example, the image forming unit 20 may use as the gradation pattern Pg a pattern including plural different gradation values (e.g., gradation representing different brightness levels) arranged into a row. Then, the image forming unit 20 uses the developing unit 22 to develop a correction toner image (e.g., FIG. 4) corresponding to the electrostatic latent image (gradation pattern Pg) on the surface of the image carrier. The image forming unit 20 then uses the transfer unit 23 to transfer the correction toner image on the image carrier corresponding to the gradation pattern Pg to the intermediate transfer belt. The image forming unit 20 then transfers the correction toner image on the intermediate belt onto the surface of a recording medium. In this way, the image forming unit 20 forms a correction image (e.g., FIG. 5) on the surface of the recording medium.

In one embodiment, the image forming unit 20 may use as the gradation pattern Pg a pattern including plural different gradation values corresponding to each of the colors black (K), cyan (C), magenta (M), and yellow (Y) of the toner. Also, the image forming unit 20 may be configured to determine features such as the shape, size, and layout of the gradation pattern Pg according to the specification and arrangement of the detection unit 30, for example. Alternatively, the image forming unit 20 may use as the gradation pattern Pg a pattern having features such as the shape and size determined beforehand through experiment or calculation.

The image processing unit 30 is configured to process (e.g., generate, correct, modify) image data of the image to be formed by the image forming unit 20. The image processing unit 30 includes a data generation unit 31, a correction unit, a calculation unit 33, and a determination unit 34. The data generation unit 31 is configured to generate image data (e.g., data corresponding to color images to be formed on the surface of a recording medium) based on data (e.g., print data) input via the I/F unit 60. The correction unit 32 is configured to calculate a correction value for correcting the image data generated by the data generation unit 31. For example, the image processing unit 30 may use a gamma value (referred to as "gamma data Dγ" hereinafter) as the correction value. However, the correction value used in the present invention is not limited to a gamma value (gamma data Dγ).

The calculation unit 33 is configured to calculate correction information for enabling the correction unit 32 to calculate the correction value (e.g., gamma data Dγ). For example, the calculation unit 33 may calculate an ACC pattern characteristic Dca (image forming characteristic) and a transfer pattern characteristic Dct (transfer characteristic) as correction information. The determination unit 34 is configured to determine whether a detection result of the detection unit 40 is normal. The calculation unit 33 of the present embodiment may calculate the correction information based on detection data (detection result) input from the detection unit 40.

The image processing unit 30 of the present embodiment is configured to output image data generated by the data generation unit 31 to the image forming unit 20 upon image formation. Also, the image processing unit 30 of the present embodiment is configured to correct image data generated by the data generation unit 31 based on the correction value calculated by the calculation unit 32 and output the corrected image data to the image forming unit 20 upon calibration. Also, the image processing unit 30 of the present embodiment is configured to calculate the correction value using correction information calculated by the calculation unit 33. Further, the image processing unit 30 of the present embodiment is configured to use the determination unit 34 to determine whether a detection result detected by the detection unit 40 is normal based on a predetermined threshold value.

The predetermined threshold value in the present embodiment includes a first threshold value TH1 and a second threshold value TH2. The determination unit 34 of the present embodiment may determine that the detection result of the detection unit 40 is not normal when a detection value (digital value) relating to a correction toner image detected by the detection unit 40 is less than or equal to the first threshold value TH1, for example. Also, the determination unit 34 may determine that the detection result of the detection unit 40 is not normal when a detection value (digital value) relating to a correction toner image detected by the detection unit 40 is greater than or equal to the second threshold value TH2, for example. Further, the determination unit 34 may determine that the detection result of the detection unit 40 is normal when a detection value (digital value) relating to a correction toner image detected by the detection unit 40 is greater than the first threshold value TH1 and less than the second threshold value TH2, for example.

In one embodiment, the image processing unit 30 may be configured to perform additional processes such as a color conversion process, a black color generation process, and/or an intensity conversion process on the generated image data. In another embodiment, the image processing unit 30 may be configured to correct the image data also using information relating correction input to the I/F unit 60. In another embodiment, the image processing unit 30 may be configured to correct the image data also using information such as recording medium information, charts, formulas, and/or programs stored in the storage unit 50.

It is noted that image gradation correction operations performed by the image processing unit 30 of the present embodiment are described in detail below.

The detection unit 40 is configured to detect an image formed on the surface of a recording medium and a toner image transferred on the surface of the intermediate transfer belt. The detection unit 40 includes an image detection unit 41 that detects a correction image formed on the surface of a recording medium, and a transfer detection unit 42 that detects a correction toner image transferred on the surface of the intermediate transfer belt.

The detection unit 40 of the present embodiment is configured to use the image detection unit 41 and the transfer detection unit 42 to detect an image formed on the surface of a recording medium and a toner image transferred on the surface of the intermediate transfer belt. Also, upon calibration, the detection unit 40 of the present embodiment uses the image detection unit 41 and/or the transfer detection unit 42 to detect a correction image corresponding to the gradation pattern Pg formed on the surface of the recording medium and/or a correction toner image corresponding to the gradation patter Pg transferred on the surface of the intermediate transfer belt. Further, upon calibration, the detection unit 40 of the present embodiment outputs the detection result of the image detection unit 41 (detected correction image) to the image processing unit 30 (correction unit 32).

The image detection unit 41 is configured to detect an image formed on the surface of a recording medium. The image detection unit 41 may detect the intensity (e.g., intensity value, resolution, dot density) of a correction image corresponding to the gradation pattern Pg (e.g., intensity correction chart), the amount of toner applied, or the brightness of the image, for example. It is noted that the image detection unit 41 of the detection unit 40 may be installed within the image forming apparatus 100, or alternatively, the image detection unit 41 of the detection unit 40 may be an external device (e.g., scanner, intensity measuring device, intensity sensor).

The transfer detection unit 42 is configured to detect a toner image transferred on the surface of the intermediate transfer belt. The transfer detection unit 42 may detect the intensity (e.g., intensity value, resolution, dot density) of the toner image, the amount of toner applied, or the brightness of the toner image, for example. The transfer detection unit 42 of the detection unit 40 may be embodied by plural detection sensors (e.g., sensors 42F, 42C, and 42R of FIG. 4) arranged in a direction (main scanning direction) that is orthogonal to a recording medium conveying direction Ma (see FIG. 4), for example.

It is noted that the detection methods implemented by the image detection unit 41 and the transfer detection unit 42 are not limited to the above-described detection methods. That is, the detection unit 40 may implement other various known methods for detecting an image or a toner image. Also, the image detection unit 41 may be configured to convert a detection result into a value (data format) that may be used by the image processing unit (calculation unit 33).

The storage unit 50 is configured to store information relating to the image forming apparatus 100 (e.g., status information and process information of the image forming apparatus 100), information relating to the recording medium (recording medium information), control programs, and applications, for example. The storage unit 50 may be embodied by any known storage device such as a hard disk, a memory, a ROM, or a RAM, for example.

The I/F unit 60 acts as an interface for inputting/outputting information (e.g., electrical signal) to/from the exterior of the image forming apparatus 100. The I/F unit 60 of the present embodiment may enable information relating to the image forming apparatus 100 to be input from an external device (e.g., PC), for example. Also, the I/F unit 60 may enable information relating to the image forming apparatus 100 to be output to an external device (e.g., PC), for example.

In one embodiment, the I/F unit 60 may include an input unit that may be used by a user (operator) to input predetermined information (e.g., information relating to correction, calibration conditions, operation conditions, output conditions, etc.) to the image forming apparatus 100 from the exterior. For example, the I/F unit 60 may include a user interface such as an operation panel as the input unit. The I/F unit 60 may also include an output unit that outputs (e.g., displays) information (e.g., detection results, calculation results, determination results, etc.) to the exterior of the image forming apparatus 100. For example, the I/F unit 60 may include a display unit such a touch panel as the output unit.

(Image Forming Apparatus Functions)

Figure 2:
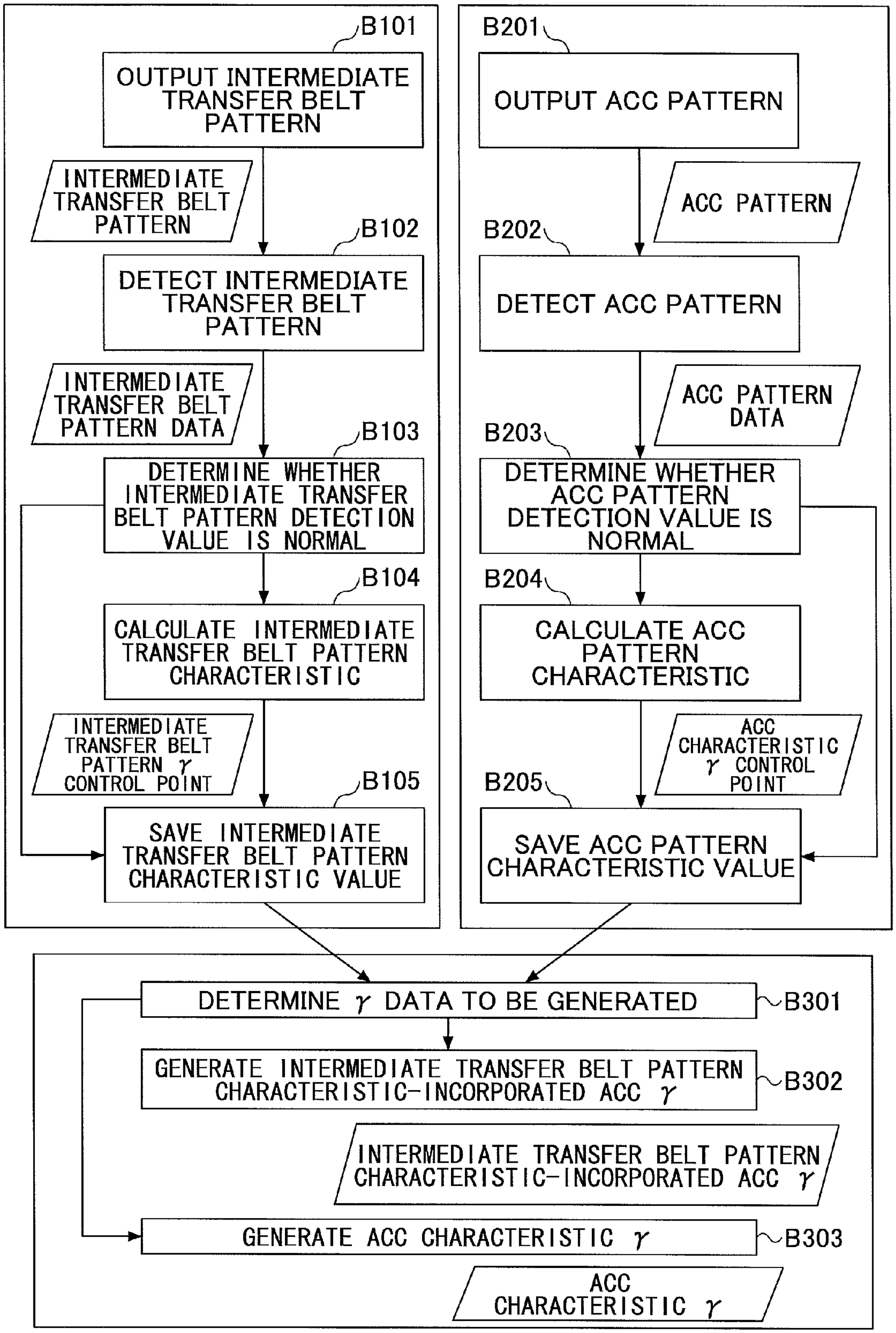
FIG. 2 illustrates exemplary functions of the image forming apparatus.

FIG. 2 illustrates functional blocks B101-B105, B201-B205, and B301-B303 representing exemplary functions of the image forming apparatus 100 of the present embodiment.

As illustrated in FIG. 2, the image forming apparatus 100 of the present embodiment implements functional blocks B101-B105 to calculate a transfer pattern characteristic Dct relating to an image of the gradation pattern Pg transferred on the intermediate transfer belt as a transfer characteristic. Also, the image forming apparatus 100 of the present embodiment implements functional blocks B201-B205 to calculate (detect) an ACC pattern characteristic Dca relating to an image of the gradation pattern Pg formed on a recording medium upon executing ACC (Automatic Color Calibration) as an image forming characteristic. Further, the image forming apparatus 100 of the present embodiment implements functional blocks B301-B303 to calculate gamma data Dγ as a correction value.

The image forming apparatus 100 uses the control unit 10 (FIG. 1) to control operations of various units based on relevant information input via the I/F unit 60 (e.g., operation request, image formation command, print request, or print job manually input via an operation panel).

The image forming apparatus 100 of the present embodiment uses the functional block B302 to calculate the gamma data Dγ (correction value) based on the transfer pattern characteristic Dct and the ACC pattern characteristic Dca (referred to as “dual characteristics gamma data Dγat” hereinafter).

Specifically, to calculate the transfer pattern characteristic Dct, first, in B101, the image forming apparatus 100 uses the image forming unit 20 to transfer a correction toner image corresponding to the gradation pattern Pg (intermediate transfer belt pattern) onto the intermediate transfer belt. Then, in B102, the image forming apparatus 100 uses the detection unit 40 (transfer detection unit 42) to detect (scan) the correction toner image (intermediate transfer belt pattern) on the intermediate transfer belt and obtain intermediate transfer belt pattern data. Then, in B103, the image forming apparatus 100 uses the image processing unit 30 (determination unit 34) to determine whether the detection result (detection value) of the detection unit 40 (transfer detection unit 42) is normal.

If the determination unit 34 determines that the detection result of the transfer detection unit 42 is normal, the determination unit 34 outputs the detection result to the calculation unit 33. On the other hand, if the determination unit 34 determines that the detection result of the transfer detection unit 42 is not normal, the determination unit 34 outputs the detection result to the storage unit 50.

Then, in B104, the image forming apparatus 100 uses the image processing unit 30 (calculation unit 33) to calculate the transfer pattern characteristic Dct of the intermediate transfer belt (e.g., intermediate transfer belt pattern control point). Also, in B105, the image forming apparatus 100 uses the storage unit 50 to store the calculation result of the calculation unit 33 and/or the detection result of the detection unit 40.

To calculate the ACC pattern characteristic Dca, first, in B201, the image forming apparatus 100 uses the image forming unit 20 to transfer a correction image (e.g., ACC pattern) corresponding to the gradation pattern Pg on a recording medium. Then, in B202, the image forming apparatus 100 uses the detection unit 40 to detect (scan) the correction image on the recording medium and obtain ACC pattern data. Then, in B203, the image forming apparatus 100 uses the image processing unit 30 (determination unit 34) to determine whether the detection result (detection value) of the detection unit 40 (image detection unit 41) is normal.

If the determination unit 34 determines that the detection result of the image detection unit 41 is normal, the determination unit 34 outputs the detection result to the calculation unit 33. On the other hand, if the determination unit 34 determines that the detection result of the image detection unit 41 is not normal, the determination unit 34 outputs the detection result to the storage unit 50.

Then, in B204, the image forming apparatus 100 uses the image processing unit 30 (calculation unit 33) to calculate the ACC pattern characteristic Dca (e.g., ACC characteristic γ control point) of the recording medium. Also, in B205, the image forming apparatus 100 uses the storage unit 50 to store the calculation result of the calculation unit 33 and/or the detection result of the detection unit 40.

To calculate the correction value (gamma data Dγ), first, in B301, the image forming apparatus 100 uses the image processing unit 30 (determination unit 34) to select either the transfer pattern characteristic Dct and the ACC pattern characteristic Dca or only the ACC pattern characteristic Dca as data to be used to calculate the correction value. Specifically, the image processing unit 30 obtains the transfer pattern characteristic Dct and the ACC pattern characteristic Dca stored in the storage unit 50. When the determination unit 34 determines that the calculation result of the calculation unit 33 (or the detection result of the transfer detection unit 42) is normal, the control unit 10 outputs the transfer pattern characteristic Dct and the ACC pattern characteristic Dca to the correction unit 32 (B302). When the determination unit 34 determines that the calculation result of the calculation unit 33 (or the detection result of the transfer detection unit 42) is not normal, the control unit 10 outputs only the ACC pattern characteristic Dca to the correction unit 32 (B303).

In B302, the image forming apparatus 100 uses the image processing unit 30 to calculate dual characteristics gamma data Dγat (e.g., intermediate transfer belt pattern characteristic-incorporated ACC γ). In B303, the image forming apparatus 100 uses the image processing unit 30 to calculate ACC gamma data Dγa (e.g., ACC characteristic γ).

(Image Forming Operations)

In the following, operations performed by the image forming apparatus 100 of the present embodiment for forming an image on a recording medium are described.

To form an image, first, the image forming apparatus 100 of the present embodiment uses the charge unit 21 to electrostatically charge the surfaces of plural image carriers corresponding to different colors (e.g., photoconductor drums corresponding to the colors black (K), cyan (C), magenta (M), and yellow (Y)). Also, the image forming apparatus 100 rotates the charged image carriers and uses an exposure unit to irradiate light on the surfaces of the image carriers based on image data. In this way, the image forming apparatus 100 generates an electrostatic latent image of a corresponding color on the surface of each of the image carriers.

Then, the image forming apparatus 100 uses the developing unit 22 to develop the electrostatic latent images formed on the image carriers corresponding to the different colors into visible toner images. The image forming apparatus 100 then transfers the toner images formed on the image carriers onto the intermediate transfer belt in a manner such that the toner images are superposed one on top of the other. In this way, the image forming apparatus 100 forms a full color toner image on the intermediate transfer belt. Then, the image forming apparatus 100 conveys a recording medium between the intermediate transfer belt and the transfer unit 23 at the time the full color toner image on the intermediate transfer belt reaches a position opposite the transfer unit 23. At this timing, the image forming apparatus 100 uses the transfer unit 23 to transfer the full color toner image onto the surface of the recording medium. In this way, the image forming apparatus 100 forms a color image on the surface of the recording medium.

Then, the image forming apparatus 100 conveys the recording medium having the image formed thereon to a fixer using a conveying belt, for example. The image forming apparatus 100 fixes the image (e.g., toner, ink) formed on the recording medium using heat and pressure. Then, the image forming apparatus 100 may use a neutralizer and a cleaner, for example, to neutralize and clean the surfaces of the image carriers and the intermediate transfer belt to perform a next sequence of image forming operations.

(Image Gradation Correction Operations)

Referring to FIGS. 3-6, operations performed by the image forming apparatus 100 of the present embodiment for correcting the gradation of an image are described below.

Figure 3:
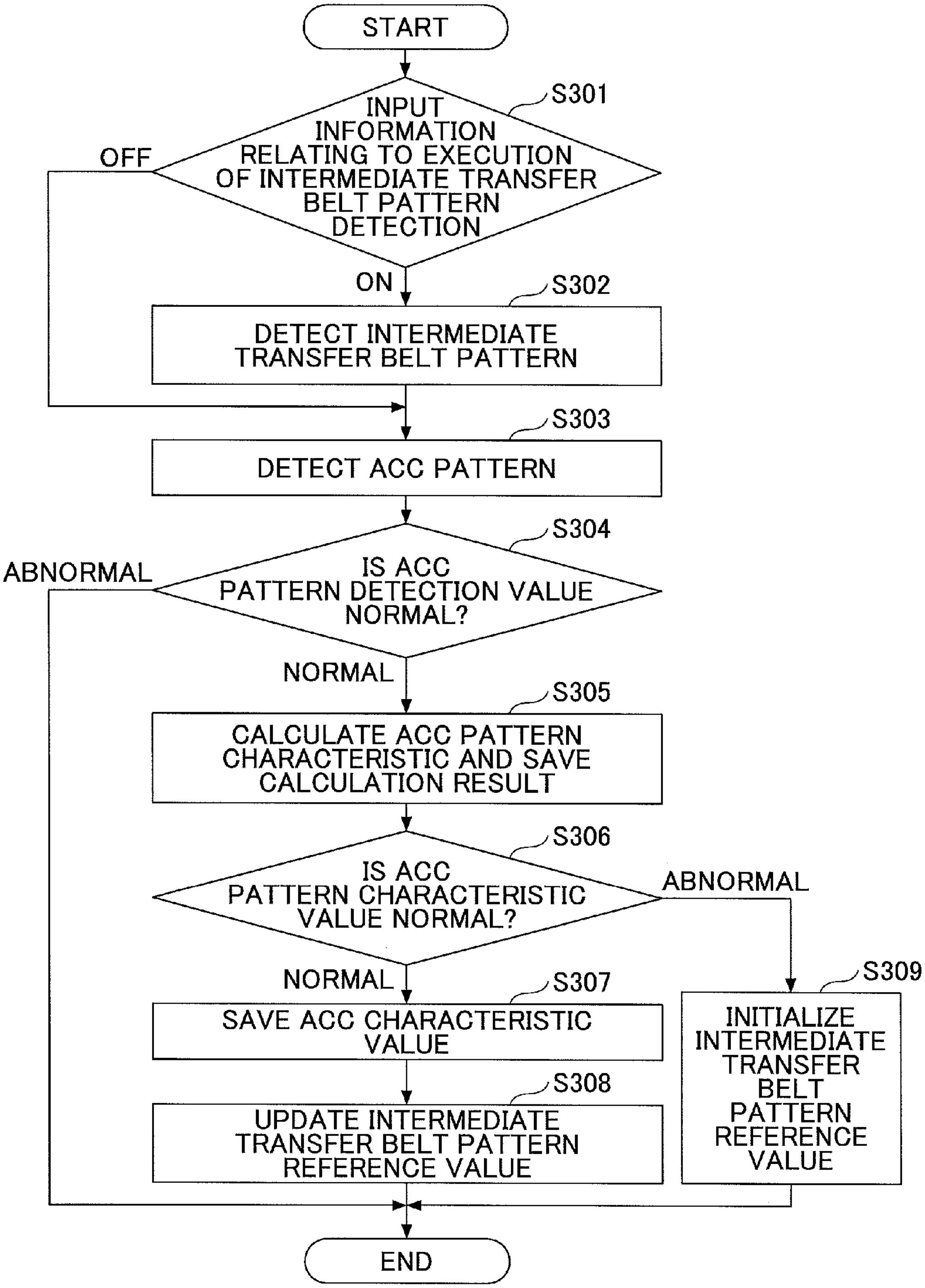
FIG. 3 is a flowchart illustrating exemplary operations of the image forming apparatus upon executing automatic color calibration.
Figure 6:
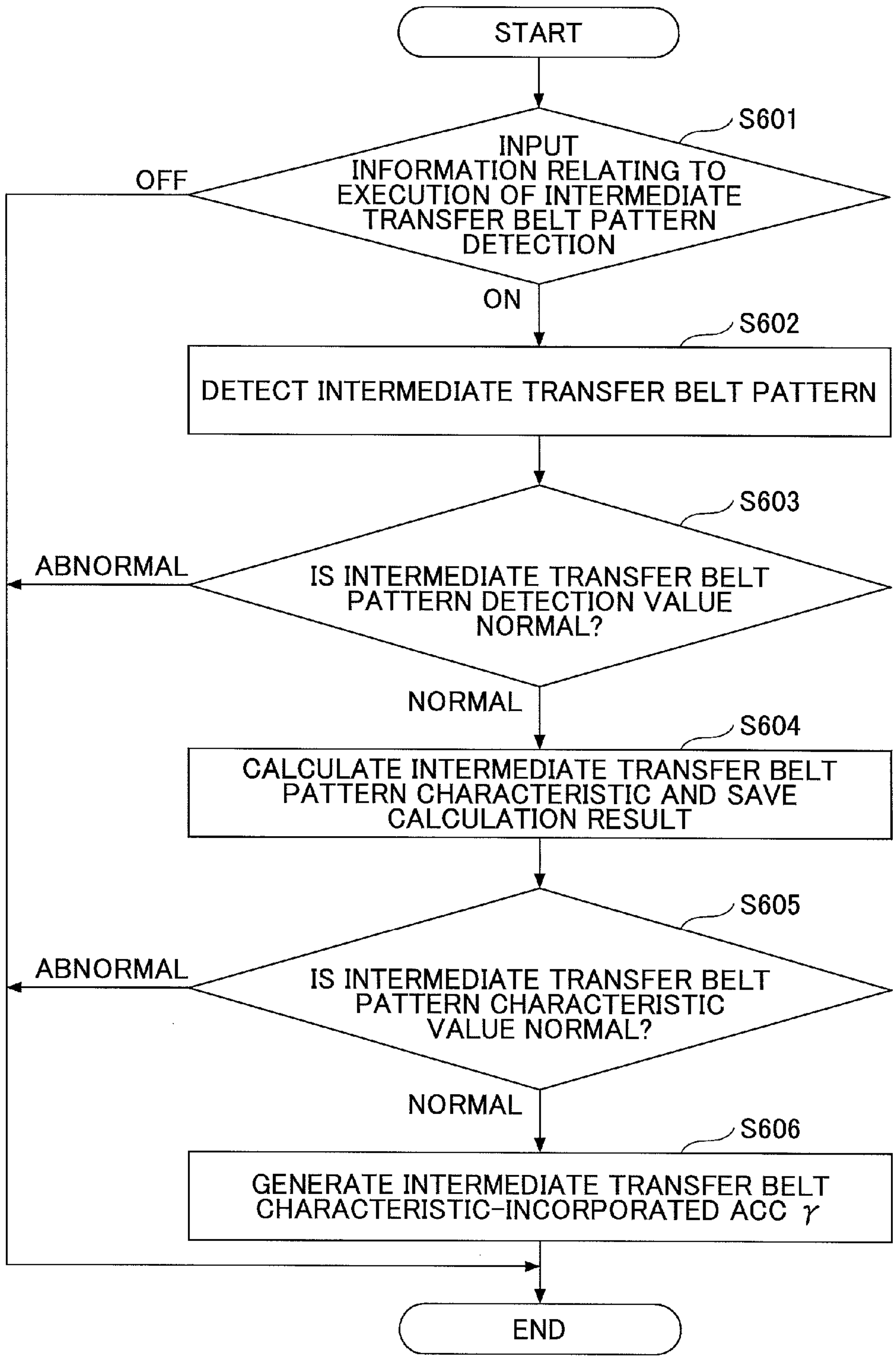
FIG. 6 is a flowchart illustrating exemplary operations of the image forming apparatus upon executing process control.

First, upon executing ACC, the image forming apparatus 100 of the present embodiment executes steps S301-S309 of FIG. 3 to determine the image forming characteristic (ACC pattern characteristic Dca) and transfer characteristic (reference value Db). Then, upon executing process control (where the image forming apparatus 100 automatically performs image correction), the image forming apparatus 100 of the present embodiment executes steps S601-S606 of FIG. 6 to calculate the correction value (dual characteristics gamma data Dγat). In the following, the process steps of FIGS. 3 and 6 are described in detail.

Referring to FIG. 3, upon executing ACC, first, in step S301, information relating to ACC execution is input to the image forming apparatus 100 by a user using the I/F unit 60. In a case where information relating to detecting a correction toner image corresponding to the gradation pattern Pg transferred on the intermediate transfer belt is input, the image forming apparatus 100 proceeds to step S302. In other cases, the image forming apparatus 100 proceeds to step S303.

Figure 4:
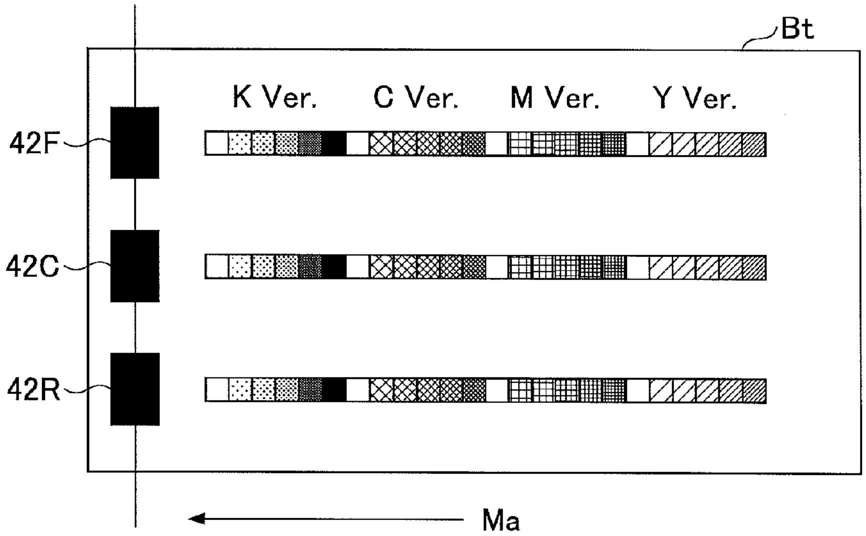
FIG. 4 illustrates an exemplary gradation pattern transferred on the surface of an intermediate transfer belt.
Figure 5:
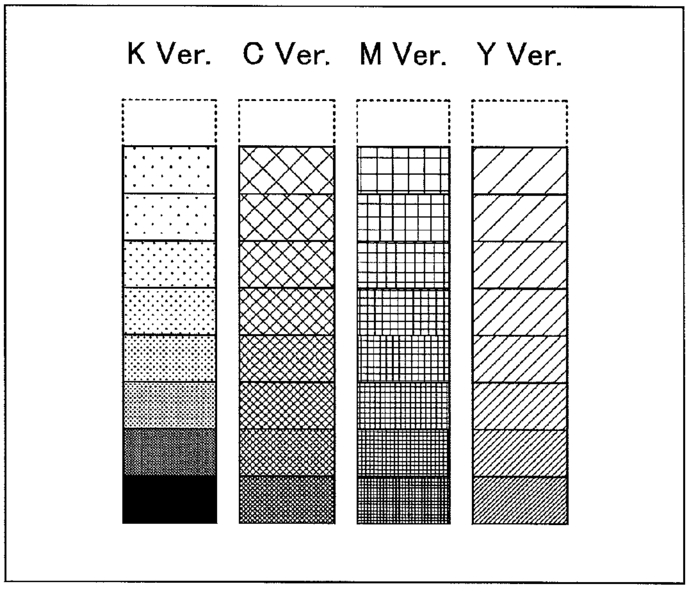
FIG. 5 illustrates an exemplary gradation pattern formed on the surface of a recording medium.

Before proceeding to the next step, the image forming apparatus 100 may use the image forming unit 20 to form a correction toner image and a correction image corresponding to the gradation pattern Pg on the surfaces of the intermediate transfer belt and the recording medium (image formation step). For example, as illustrated in FIG. 4, the image forming unit 20 may form a correction toner image including patterns of different intensities (patches 1-6) in the colors CMYK arranged into a row (arranged continuously in the medium conveying direction Ma) on the intermediate transfer belt Bt. Also, as illustrated in FIG. 5, the image forming unit 20 may form a correction image arranged into rows including patterns of different intensities (patches 1-9) in the colors CMYK on the surface of the recording medium.

Then, in step S302, the image forming apparatus 100 uses the transfer detection unit 42 (detection unit 40) to detect the correction toner image corresponding to the gradation pattern Pg formed on the surface of the intermediate transfer belt (detection step) after which the image forming apparatus 100 proceeds to step S303.

Specifically, the transfer detection unit 42 detects the gradation pattern of the correction toner image as a digital value (referred to as "detection value" hereinafter). For example, the transfer detection unit 42 may detect the following detection values at an accuracy of 10 bits (1024 levels).

992, 880, 752, 624, 496, 368 (C version detection value (output value))

976, 864, 736, 608, 480, 352 (M version detection value (output value))

960, 848, 720, 592, 464, 336 (Y version detection value (output value)

1008, 896, 768, 640, 512, 384 (K version detection value (output value))

Then, in step S303, the image forming apparatus 100 uses the image detection unit 41 (detection unit 40) to detect the correction image corresponding to the gradation pattern Pg formed on the surface of the recording medium (detection step) after which the image forming apparatus 100 proceeds to step S304.

Specifically, the image detection unit 41 detects a detection value corresponding to the gradation pattern (ACC pattern) of the correction image. For example, the image detection unit 41 may detect the following detection values.

0, 16, 38, 68, 104, 136, 170, 210, 255 (C version detection value (output value))

0, 16, 38, 68, 104, 136, 170, 210, 255 (M version detection value (output value))

0, 16, 38, 68, 104, 136, 170, 210, 255 (Y version detection value (output value))

0, 16, 38, 68, 104, 136, 170, 210, 255 (K version detection value (output value))

In step S304, the image forming apparatus 100 uses the determination unit 34 (image processing unit 30) to determine whether a detection result (detection value) detected in step 303 is normal. Specifically, when the detection value of the correction image is greater than the first threshold value TH1 and is less than the second threshold value TH2, the determination unit 34 may determine that the detection result is normal. When the detection value of the correction image is less than or equal to the first threshold value TH1 or greater than or equal to the second threshold value TH2, the determination unit 34 may determine that the detection result is not normal.

When it is determined that the detection result is normal, the image forming apparatus 100 proceeds to step S305. When it is determined that the detection result is not normal, the image forming apparatus 100 stores the detection result and other related information in the storage unit 50 and ends the ACC operations.

In one embodiment, when it is determined that the detection result is not normal, the image forming apparatus 100 may repeat the above-described steps S301-S304 a certain number of times (e.g., three times). Further, the image forming apparatus 100 may display a message at a display unit (I/F unit 60) for prompting the user to input a command for repeating the above process steps, for example.

In step S305, the image forming apparatus 100 uses the calculation unit 33 (image processing unit 30) to calculate the image forming characteristic (ACC pattern characteristic Dca) based on the detection result detected in step S303. After calculating the image forming characteristic, the image forming apparatus 100 stores the calculation result in the storage unit 50 and proceeds to step S306.

In step S306, the image forming apparatus 100 uses the determination unit 34 (image processing unit 30) to determine whether the image forming characteristic (ACC pattern characteristic Dca) calculated in step S305 is normal. When it is determined that the calculation result is normal, the image forming apparatus 100 proceeds to step S307. When it is determined that the calculation result is not normal, the image forming apparatus 100 stores the calculation result and related information in the storage unit 50 and proceeds to step S309.

In step S307, the image forming apparatus 100 uses the storage unit 50 to store the calculation result obtained in step S305 after which the image forming apparatus 100 proceeds to step S308.

In step S308, the image forming apparatus 100 uses the storage unit 50 to store (update) the detection result detected in step S302 as a reference value Db of the intermediate transfer belt pattern after which the image forming apparatus 100 ends the ACC operations.

On the other hand, when it is determined that the calculation result (ACC pattern characteristic) is not normal, in step S309, the image forming apparatus 100 initializes the reference value Db of the intermediate transfer belt pattern. That is, the image forming apparatus 100 initializes (resets) the detection result and does not use the detection result obtained from detecting the correction toner image corresponding to the gradation pattern Pg (S302) in subsequent process control operations (FIG. 6) for calculating a correction value (e.g., gamma value). After initializing the reference value Db, the image forming apparatus 100 ends the ACC operations.

Referring to FIG. 6, upon executing process control, first, in step S601, information relating to process control execution is input to the image forming apparatus 100 by the user via the I/F unit 60. In a case where the input information relates to detection of a correction toner image corresponding to the gradation pattern Pg transferred on the intermediate transfer belt (i.e., in the case of detecting the latest correction toner image transferred on the intermediate transfer belt), the image forming apparatus 100 proceeds to step S602. In other cases, the image forming apparatus 100 ends the process control operations.

In step S602, the image forming apparatus 100 uses the transfer detection unit 42 (detection unit 40) to detect the correction toner image corresponding to the gradation pattern Pg on the intermediate transfer belt (detection step). It is noted that the correction toner image detection step S602 is similar to the detection step S302 of FIG. 3 so that descriptions thereof are omitted. After detecting the correction toner image, the image forming apparatus 100 proceeds to step S603.

In step S603, the image forming apparatus 100 uses the determination unit 34 (image processing unit 30) to determine whether the detection result detected in step S602 is normal in a manner similar to step S304 of FIG. 3. Specifically, when the detection value of the correction image is greater than the first threshold value TH1 and is less than the second threshold value TH2, the determination unit 34 may determine that the detection result is normal. When the detection value of the correction image is less than or equal to the first threshold value TH1 or greater than or equal to the second threshold value TH2, the determination unit 34 may determine that the detection result is not normal.

When it is determined that the detection result is normal, the image forming apparatus 100 proceeds to step S604. When it is determined that the detection result is not normal, the image forming apparatus 100 stores the detection result and other related information in the storage unit 50 and ends the process control operations.

In step S604, the image forming apparatus 100 uses the calculation unit 33 (image processing unit 30) to calculate a transfer characteristic (transfer pattern characteristic Dct) based on the detection result detected in step S602. After calculating the transfer characteristic, the image forming apparatus 100 stores the calculation result in the storage unit 50 and proceeds to step S605.

In step S605, the image forming apparatus 100 uses the determination unit 34 (image processing unit 30) to determine whether the calculation result (transfer characteristic) calculated in step S604 is normal. When it is determined that the calculation result is normal, the image processing apparatus 100 proceeds to step S606. When it is determined that the calculation result is not normal, the image processing apparatus 100 ends the process control operations.

In step S606, the image forming apparatus 100 calculates dual characteristics gamma data Dγat (intermediate transfer belt pattern characteristic-incorporated ACC γ) based on the transfer characteristic (transfer pattern characteristic Dct) calculated in step S604 and the image forming characteristic (ACC pattern characteristic Dca) calculated upon execution of ACC (step S305 of FIG. 3). After calculating the dual characteristics gamma data Dγat, the image forming apparatus 100 stores the calculation result in the storage unit 50 and ends the process control operations.

In one embodiment, the image forming apparatus 100 may calculate the image forming characteristic based on the correction image detected by the image detection unit 41 (detection unit 40) in a first detection, and calculate the transfer characteristic based on the correction toner image detected by the transfer detection unit 42 (detection unit 40) in a second detection. In this way, the image forming apparatus 100 may use a comparison result of comparing the image forming characteristic and the transfer characteristic respectively calculated in the first detection and the second detection to perform correction according to time degradation of the intermediate transfer belt (e.g., change in intermediate intensity value, change in electric potential), for example.

(Program for Executing Image Forming Method and Computer-Readable Medium)

A program Pr for executing an image forming method according to an embodiment of the present invention includes program code for executing an image forming step performed upon calibration including transferring a correction toner image corresponding to a gradation pattern on a surface of an intermediate transfer medium and forming a correction image corresponding to the gradation pattern on a surface of a recording medium by transferring the correction toner image on the surface of the recording medium; a detection step including detecting the correction toner image transferred on the surface of the intermediate transfer medium and the correction image formed on the surface of the recording medium;

and an image processing step including correcting a gradation of an image to be formed based on at least one of the detected correction toner image and the detected correction image. In one embodiment, the above image processing step may include calculating an image forming characteristic based on the correction image detected by the detection step in a first detection, calculating a transfer characteristic based on the correction toner image detected by the detection step in a second detection, and performing correction according to time degradation based on a comparison result of comparing the calculated image forming characteristic and the calculated transfer characteristic. In a further embodiment, when a detection value corresponding to the correction toner image detected in the detection step is less than or equal to a first threshold value or greater than or equal to a second threshold value, the image processing step may include correcting the gradation based on a detection value corresponding to the correction image detected in the detection step.

Also, in one embodiment, the above-described program Pr may be stored in a computer-readable medium Md. The computer-readable medium Md may be any non-transitory computer-readable medium including a flexible disk (FD); a CD-ROM (Compact Disk-Read Only Memory); a CD-R (CD Recordable); a DVD (Digital Versatile Disk); a semiconductor memory such as a flash memory, a RAM (Random Access Memory), a ROM (Read Only Memory); a memory card; and a HDD (Hard Disk Drive), for example.

As can be appreciated from the above, the image forming apparatus 100 of the present embodiment is capable of correcting the gradation of an image to be formed based on a gradation pattern transferred on the surface of an intermediate transfer medium (intermediate transfer belt) and a gradation pattern formed on the surface of a recording medium. Also, the image forming apparatus 100 of the present embodiment is capable of calculating a transfer characteristic and an image forming characteristic based on a correction toner image and a correction image that are detected by the detection unit 40 and correcting the gradation of an image to be formed based on the calculated transfer characteristic and the calculated image forming characteristic. Further, by enabling the image forming apparatus 100 to correct the gradation based on the transfer characteristic and the image forming characteristic, correction may be performed based on a printer characteristic (transfer characteristic) that is automatically adjusted more frequently in proportion to the copy volume and a scanner characteristic (image forming characteristic) that has a relatively large correction effect. That is, by configuring the image forming apparatus 100 of the present embodiment to perform correction based on the transfer characteristic and the image forming characteristic, correction accuracy may be improved.

Also, by enabling the image forming apparatus 100 of the present embodiment to perform gradation correction based on a gradation pattern transferred on the surface of an intermediate transfer medium and a gradation pattern formed on the surface of a recording medium, the image forming apparatus 100 may perform correction in consideration of changes due to time degradation (e.g., change in electric potential, change in intensity of halftone). Also, by enabling the image forming apparatus 100 of the present embodiment to perform gradation correction based on a gradation pattern transferred on the surface of the intermediate transfer medium, the image forming apparatus 100 may perform correction (adjustment) without changing an image output (image forming) frequency. Thus, in the image forming apparatus 100 of the present embodiment, the number of recording media (e.g., number of recording sheets) required in performing calibration may be reduced.

In the following, specific embodiments of the present invention are described.

First Specific Embodiment

An image forming apparatus 110 according to a first specific embodiment of the present invention may have a configuration substantially identical to the image forming apparatus 100 as illustrated in FIG. 1. It is noted that features of the present embodiment that may be identical to those of the image forming apparatus 100 described above are omitted.

(Image Gradation Correction Operations)

Referring to FIGS. 7-14, operations performed by the image forming apparatus 110 for correcting the gradation of an image are described below. It is noted that because a substantial portion of the gradation correction operations of the image forming apparatus 110 may be identical to those of the image forming apparatus 100 described above, distinct operations of the image forming apparatus 110 of the present embodiment are described below.

Figure 7:
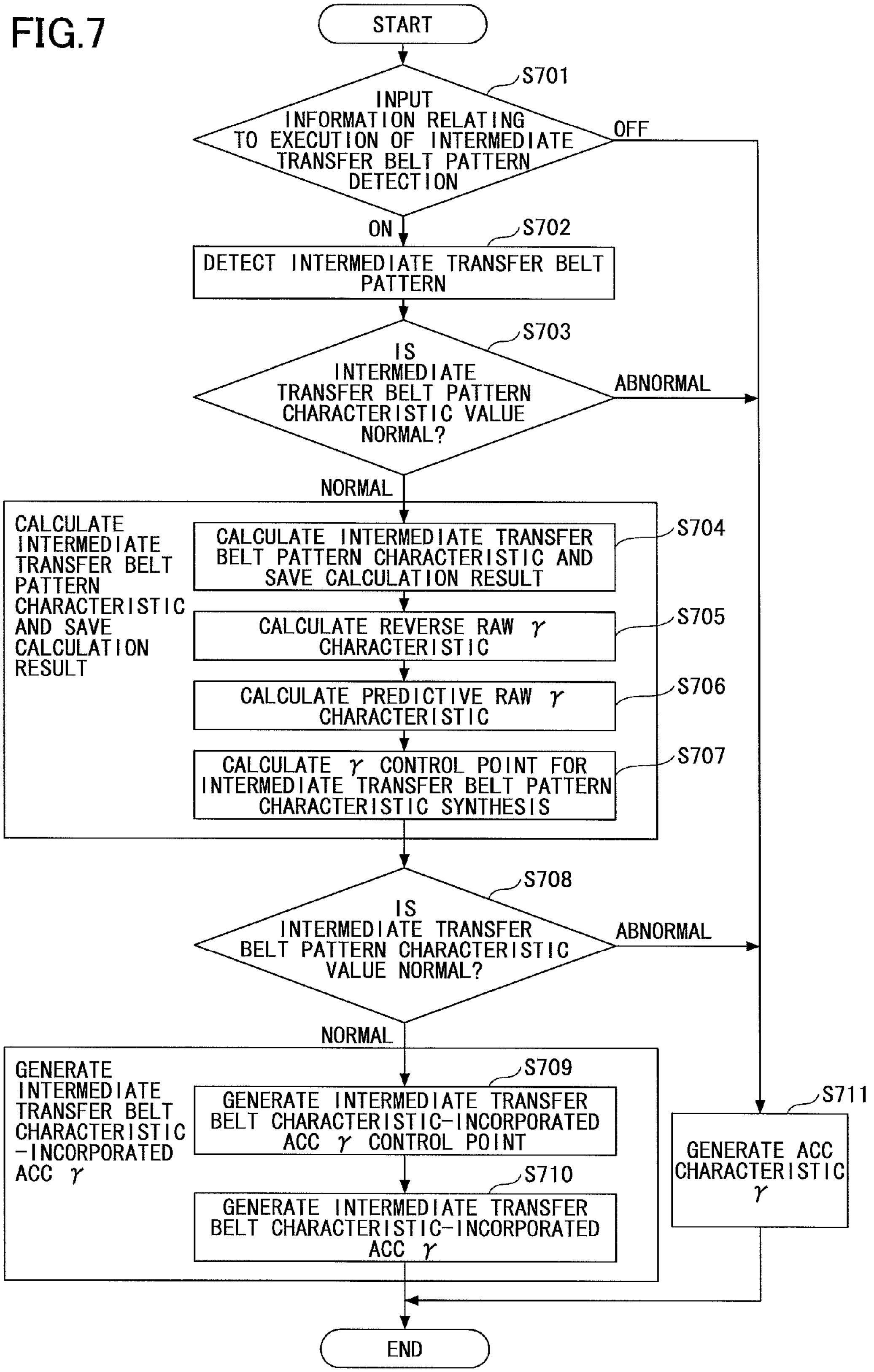
FIG. 7 is a flowchart illustrating operations performed by an image forming apparatus of a first specific embodiment for calculating a correction value.

Referring to FIG. 7, in steps S701-S703, the image forming apparatus 110 uses the transfer detection unit 42 to detect a correction toner image corresponding to the gradation pattern Pg on the surface of the intermediate transfer belt (latest scan value) in a manner similar to steps S601-S603 of FIG. 6 performed by the image forming apparatus 100. If it is determined that the detection result is normal, the image forming apparatus 110 proceeds to step S704. On the other hand, if it is determined that the detection result not normal, the image forming apparatus 110 proceeds to step S711.

In step S704, the image forming apparatus 110 uses the calculation unit 33 (image processing unit 30) to calculate a variability characteristic relating to the transfer characteristic after which the image forming apparatus 110 proceeds to step S705.

Figure 8:
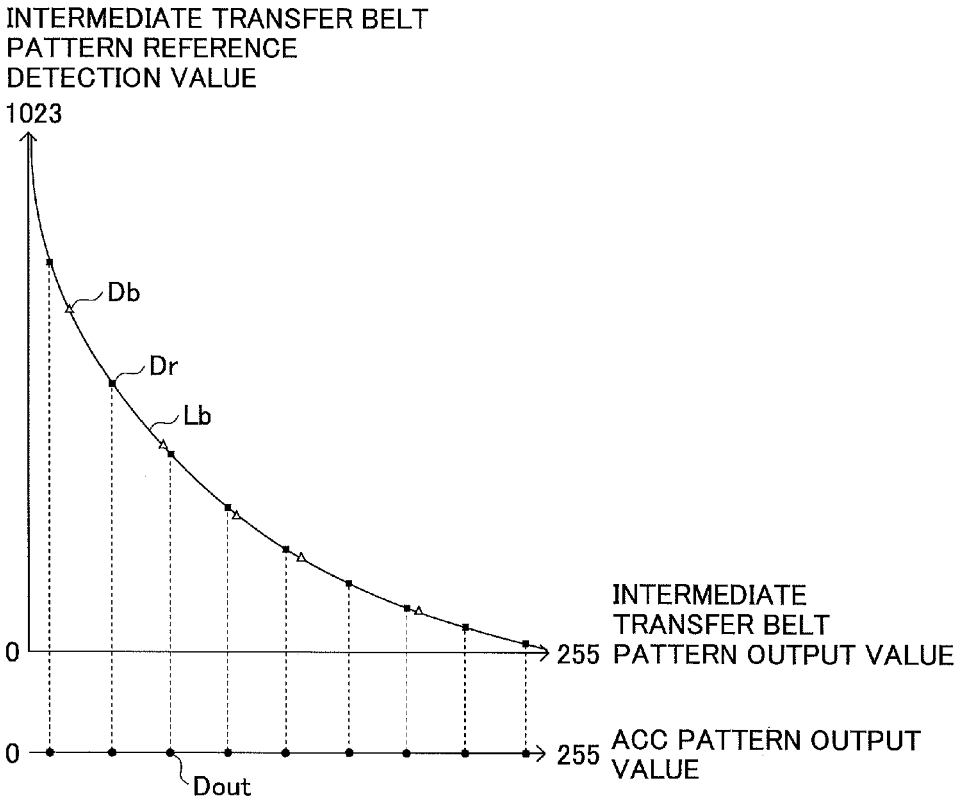
FIG. 8 is a graph illustrating operations performed by the image forming apparatus of the first specific embodiment for calculating a reference point.

Specifically, the image forming apparatus 110 of the present embodiment calculates a reference point of the intermediate transfer belt pattern corresponding to an ACC pattern output value using the reference value Db (described above in connection with step S308 of FIG. 3) of the intermediate transfer belt pattern. For example, as illustrated in FIG. 8, the image forming apparatus 110 may use the reference value Db to calculate a reference line Lb through cubic spline interpolation (or spline method, spline interpolation) and extract a value corresponding to an ACC pattern output value Dout of the reference line Lb as reference point Dr.

It is noted that the ACC pattern output value Dout used by the image forming apparatus 110 may be determined beforehand based on the intensity value of each patch of the ACC pattern. For example, the image forming apparatus 110 may use the following values as the ACC pattern output value Dout.

0, 16, 38, 68, 104, 136, 170, 210, 255 (C version ACC pattern output value)

0, 16, 38, 68, 104, 136, 170, 210, 255 (M version ACC pattern output value)

0, 16, 38, 68, 104, 136, 170, 210, 255 (Y version ACC pattern output value)

0, 16, 38, 68, 104, 136, 170, 210, 255 (K version ACC pattern output value)

Figure 9:
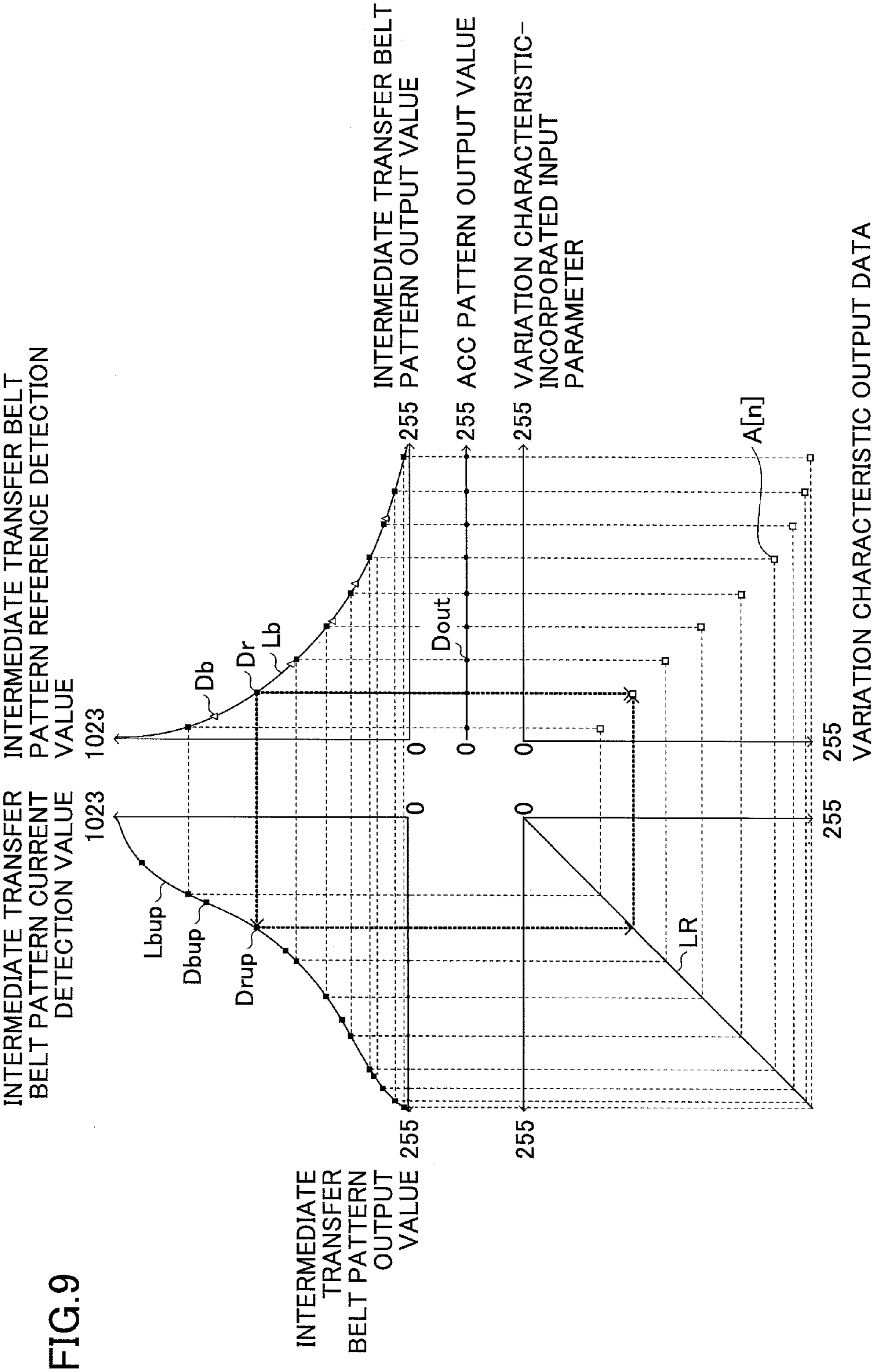
FIG. 9 is a graph illustrating operations performed by the image forming apparatus of the first specific embodiment for calculating a variation characteristic.

Then, the image forming apparatus 110 uses the latest detection value detected in step S702 to calculate the variation characteristic relating to the transfer characteristic (intermediate transfer belt detection variation characteristic). For example, as illustrated in FIG. 9, the image forming apparatus 110 may use the latest detection value Dbup to calculate a latest reference line Lbup and extract (calculate) a value corresponding to the reference point Dr of the calculated latest reference line Lb as the latest detection reference point Drup. Also, the image forming apparatus 110 may use linear data LR to calculate (select) an intermediate transfer belt detection variation characteristic A[n] (where n represents an integer) based on the latest detection reference point Drup.

For example, the image forming apparatus 110 may use the following values as the latest detection value Dbup.

0, 34, 68, 136, 204, 240 (C version intermediate transfer belt pattern output value)

0, 34, 68, 136, 204, 240 (M version intermediate transfer belt pattern output value)

0, 34, 68, 136, 204, 240 (Y version intermediate transfer belt pattern output value)

0, 34, 68, 136, 204, 240 (K version intermediate transfer belt pattern output value)

Next, in step S705, the image forming apparatus 110 uses the calculation unit 33 (image processing unit 30) to calculate a reverse raw γ characteristic after which the image forming apparatus 110 proceeds to step S706.

Figure 10:
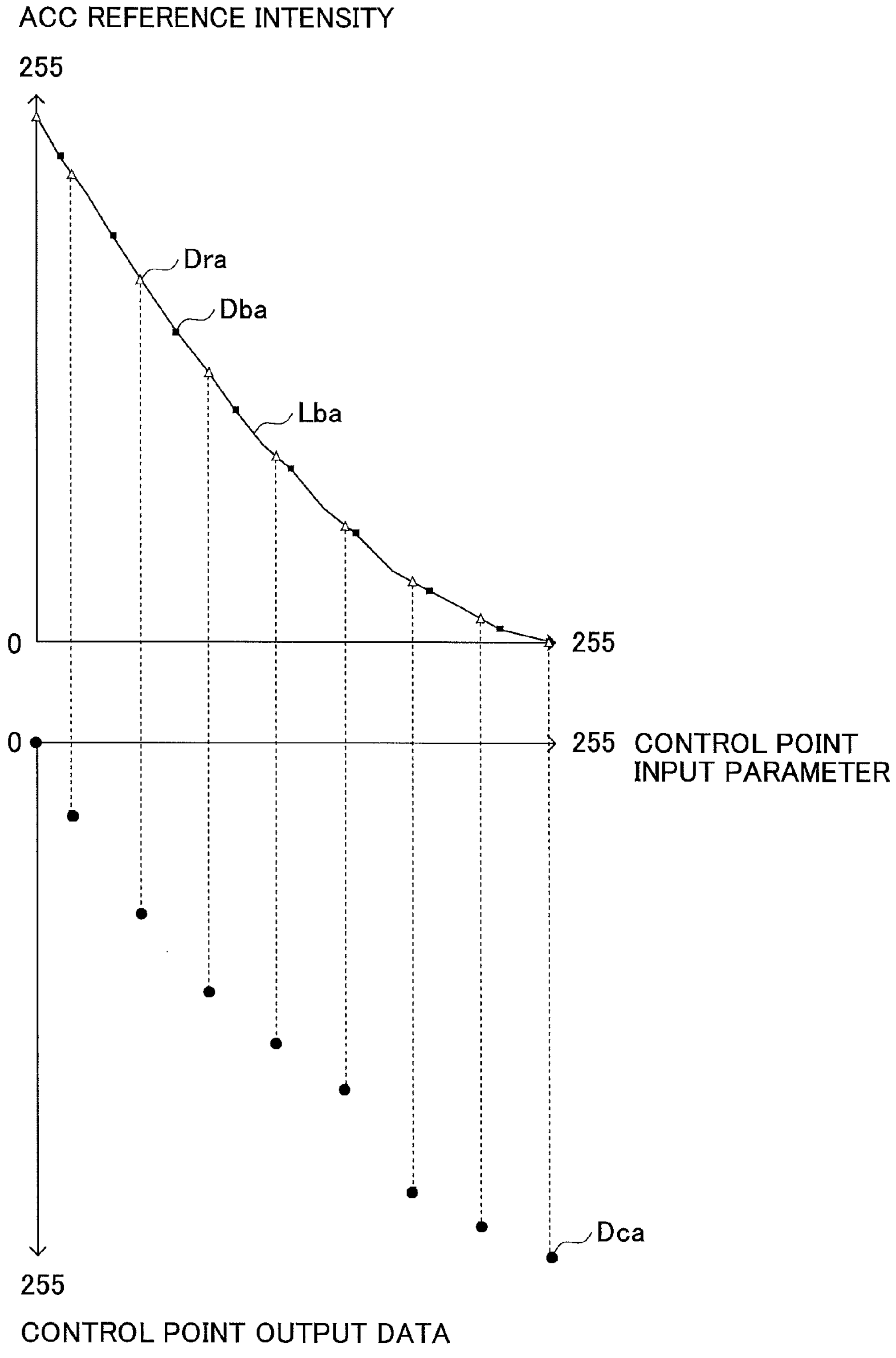
FIG. 10 is a graph illustrating operations performed by the image forming apparatus of the first specific embodiment for calculating an ACC characteristic gamma control point.

For example, as illustrated in FIG. 10, the image forming apparatus 110 of the present embodiment may search two reference points (ACC reference intensity Dba) that are adjacent to a reference ACC characteristic γ control point input parameter, and perform linear interpolation of the adjacent points Dba to calculate a reverse raw γ detection reference point Dra. Also, the image forming apparatus 110 may extract (calculate) an ACC characteristic γ control point Dca corresponding to the reverse raw detection reference point Dra. For example, the image forming apparatus 110 may calculate the following values as the ACC characteristic γ control point Dca.

0, 38, 50, 65, 79, 96, 126, 192, 255 (C version ACC characteristic γ control point (output))

0, 35, 47, 61, 77, 97, 137, 197, 255 (M version ACC characteristic γ control point (output))

0, 34, 44, 59, 78, 99, 134, 194, 255 (Y version ACC characteristic γ control point (output))

0, 38, 50, 65, 82, 101, 134, 178, 255 (K version ACC characteristic γ control point (output))

It is noted that the image forming apparatus 110 may determine the ACC reference intensity Dba beforehand based on the intensity of ACC patches, for example. The following are exemplary values that may be used as the ACC reference intensity Dba.

0, 32, 64, 96, 128, 160, 192, 224, 255 (C version ACC reference intensity x-coordinate)

0, 32, 64, 96, 128, 160, 192, 224, 255 (M version ACC reference intensity x-coordinate)

0, 32, 64, 96, 128, 160, 192, 224, 255 (Y version ACC reference intensity x-coordinate)

0, 32, 64, 96, 128, 160, 192, 224, 255 (K version ACC reference intensity x-coordinate)

1020, 806, 604, 439, 321, 219, 145, 93, 69 (C version ACC reference intensity y-coordinate)

1020, 875, 675, 496, 366, 259, 182, 119, 86 (M version ACC reference intensity y-coordinate)

1020, 892, 743, 614, 506, 418, 357, 313, 286 (Y version ACC reference intensity y-coordinate)

1020, 739, 497, 327, 204, 127, 82, 51, 31 (K version ACC reference intensity y-coordinate)

Figure 11:
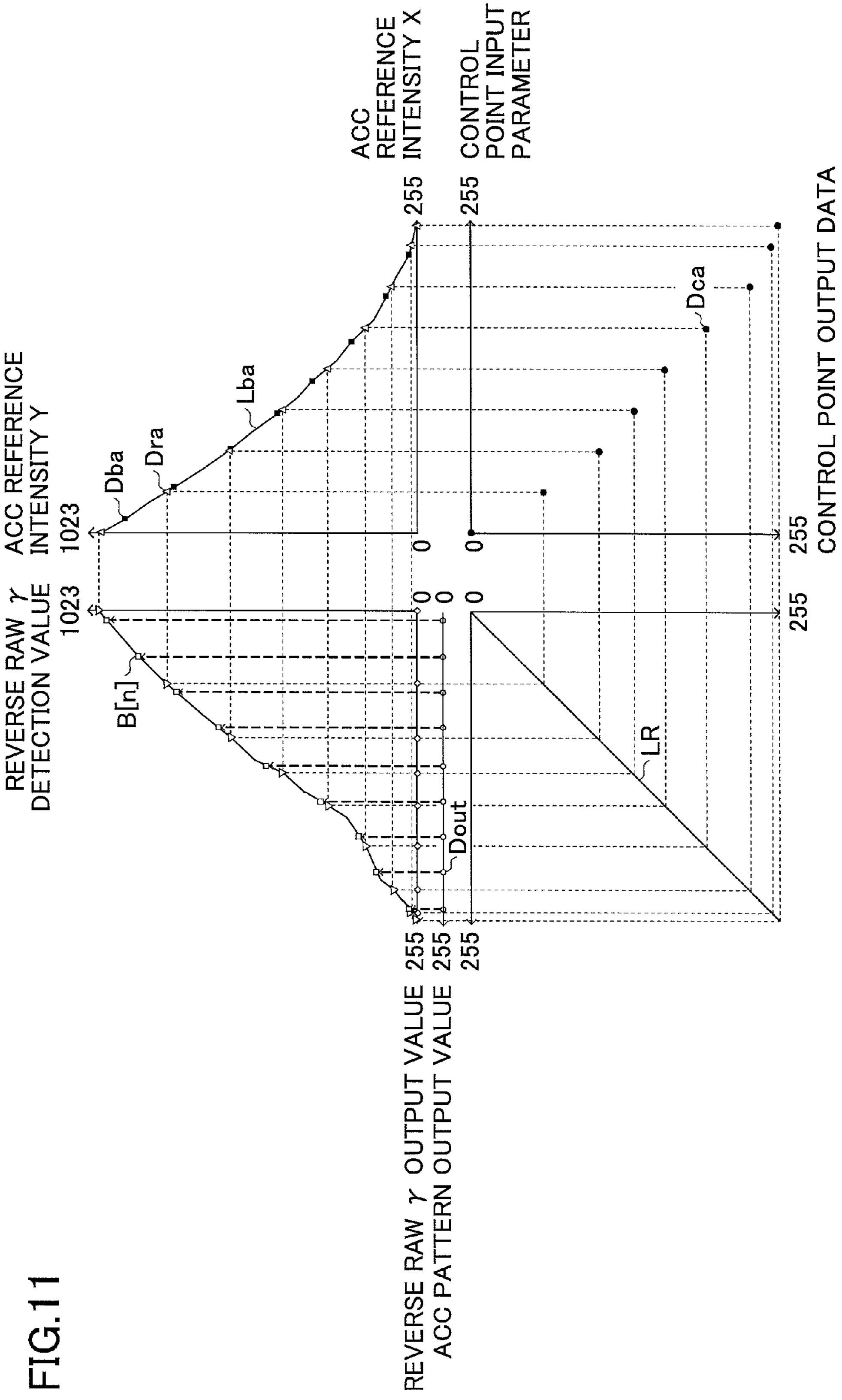
FIG. 11 is a graph illustrating operations performed by the image forming apparatus of the first specific embodiment for calculating a reverse raw gamma characteristic.

Then, the image forming apparatus 110 calculates the reverse raw γ characteristic based on the ACC characteristic γ control point Dca and the calculated reverse raw γ detection reference point Dra. For example, as illustrated in FIG. 11, the image forming apparatus 110 may perform linear interpolation of the reverse raw γ detection reference point Dra to calculate a reverse raw γ characteristic B[n] (where n represents an integer) corresponding to the ACC characteristic γ control point Dca.

Next, in step S706, the image forming apparatus 110 uses the calculation unit 33 (image processing unit 30) to calculate a predictive raw γ characteristic after which the image forming apparatus 110 proceeds to step S707.

Specifically, the image forming apparatus 110 of the present embodiment calculates a predictive raw γ characteristic D[n] (where n represents an integer) by correcting the reverse raw γ characteristic B[n] based on the transfer characteristic (intermediate transfer belt pattern characteristic). For example, using Formula 1 shown below, the image forming apparatus 110 may subtract an intermediate transfer belt pattern detection variation characteristic A[n] from the ACC pattern output value Dout (obtained in step S704) to calculate an intermediate transfer belt pattern detection variation value C[n] (where n represents an integer).

$$C[n]=Dout-A[n]\ (n=0,1,2,\ldots,\text{integer}) \qquad \text{[Formula 1]}$$

Then, the image forming apparatus 110 may use the reverse raw γ characteristic B[n] (obtained in step S705) and a correction coefficient Ka corresponding to a notch (correction precision) input (designated) by the I/F unit 60 (operation unit) to calculate the predictive raw γ characteristic D[n] (where n represents an integer) using Formula 2 shown below.

$$D[n]=B[n]-C[n]\times Ka\ (n=0,1,2,\ldots,\text{integer}) \qquad \text{[Formula 2]}$$

Figure 12:
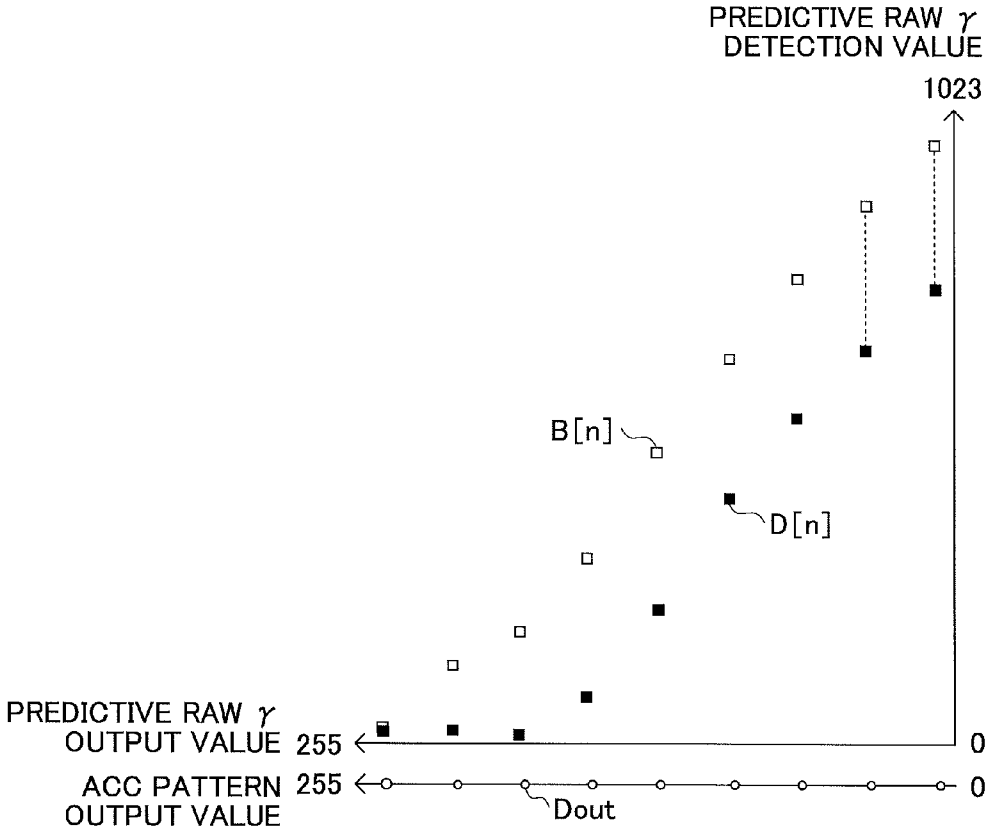
FIG. 12 is a graph illustrating operations performed by the image forming apparatus of the first specific embodiment for calculating a predictive raw gamma characteristic.

In one example, the image forming apparatus 110 may calculate values corresponding to the predictive raw γ characteristic D[n] as illustrated in FIG. 12.

Next, in step S707, the image forming apparatus 110 uses the calculation unit 33 (image processing unit 30) to calculate a synthesis γ control point (control point for intermediate transfer belt pattern characteristic synthesis) after which the image processing apparatus 110 proceeds to step S708.

Figure 13:
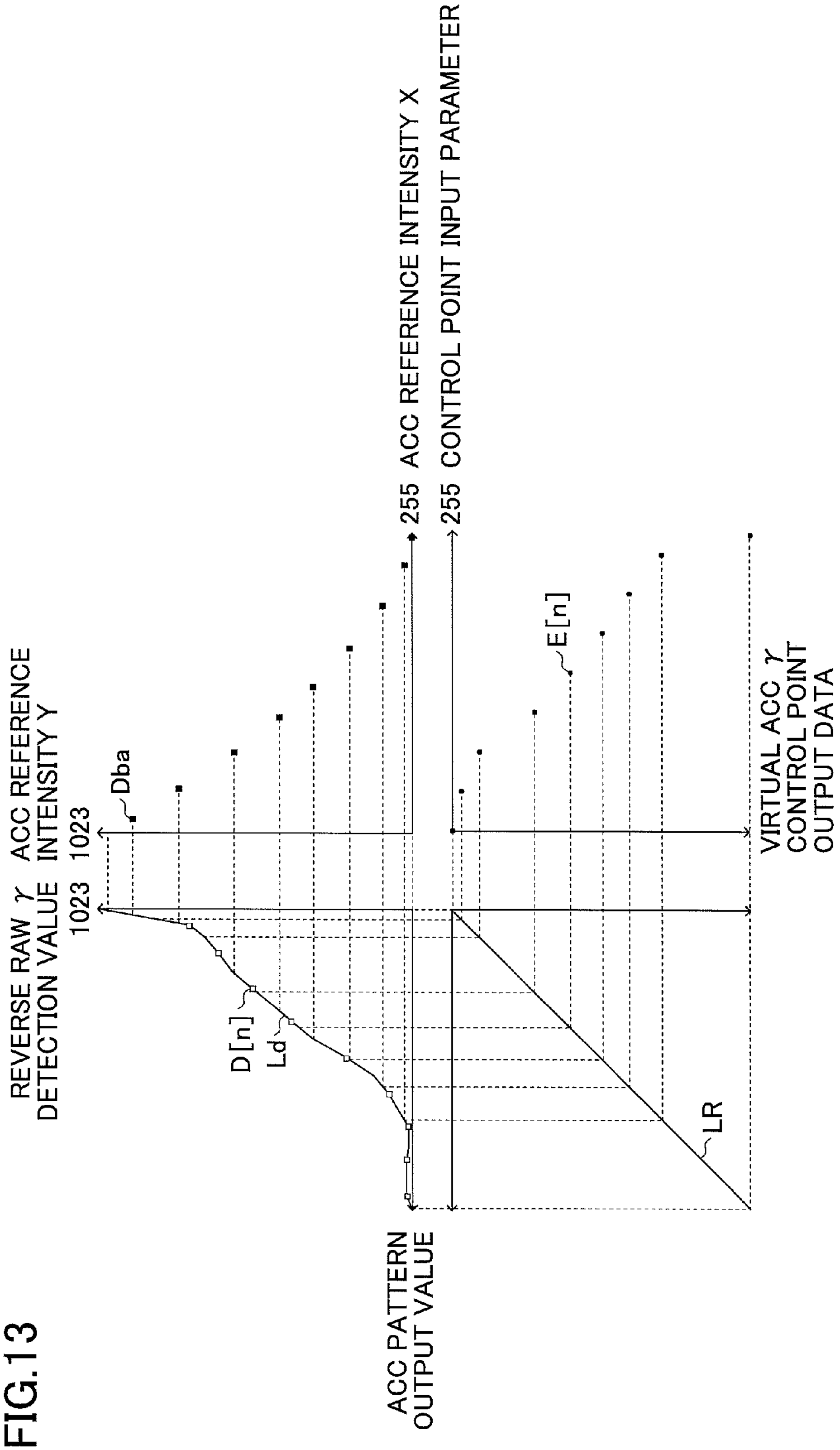
FIG. 13 is a graph illustrating operations performed by the image forming apparatus of the first specific embodiment for calculating a virtual ACC characteristic control point.

Specifically, the image forming apparatus 110 of the present embodiment calculates a virtual ACC characteristic γ control point E[n] (where n represents an integer) based on the predictive raw γ characteristic D[n], for example, and uses the calculated virtual ACC characteristic γ control point E[n] to calculate a synthesis γ control point F[n] (where n represents an integer). For example, the image forming apparatus 110 may calculate values corresponding to the virtual ACC characteristic γ control point E[n] as illustrated in FIG. 13. Also, the image forming apparatus 110 may calculate the synthesis γ control point F[n] based on Formula 3 shown below.

$$F[n]=Ein[n]-(Eout[n]-E[n])\times Ka\ (n=0,1,2,\ldots,\text{integer}) \qquad \text{[Formula 3]}$$

It is noted that Ein[n] corresponds to an ACC characteristic γ control point (input). For example, the following values may be used as the Ein[n].

0, 34, 68, 102, 136, 170, 204, 238 (C version)

0, 34, 68, 102, 136, 170, 204, 238 (M version)

0, 34, 68, 102, 136, 170, 204, 238 (Y version)

0, 34, 68, 102, 136, 170, 204, 238 (K version)

Also, it is noted that Eout[n] corresponds to an ACC characteristic γ control point (output). For example, the output data (e.g., y-coordinate value) of the ACC characteristic γ control point Dca used in the calculation of the reverse raw γ characteristic (step S705) may be used as the Eout[n].

Next, in step S708, the image forming apparatus 110 uses the determination unit 34 (image processing unit 30) to determine whether the transfer characteristic (synthesis γ control point F[n], etc.) calculated in step S707 is normal. When it is determined that the calculation result is normal, the image forming apparatus 110 proceeds to step S709. On the other hand, when it is determined that the calculation result is not normal, the image forming apparatus 110 proceeds to step S711.

For example, in a case where n is equal to 0, the determination unit 34 may determine that the calculation result is not normal when any one of the control points has a lower limit threshold value that is less than or equal to 0 or an upper limit threshold value greater than or equal to 255, or when an absolute value of the difference between any two adjacent control points of the control points is greater than or equal to a predetermined threshold value.

In step S709, the image forming apparatus 110 uses the calculation unit 33 (image processing unit 30) to calculate a control point (output) G[n] (intermediate transfer belt pattern characteristic-incorporated control point) after which the image forming apparatus 110 proceeds to step S710.

For example, the image forming apparatus 110 of the present embodiment may use Formula 4 shown below to calculate the control point (output) G[n].

$$G[n]=E\mathrm{out}[n]-(F[n]-E\mathrm{in}[n])\ (n=0,1,2,\ldots,\mathrm{integer}) \qquad \text{[Formula 4]}$$

Figure 14:
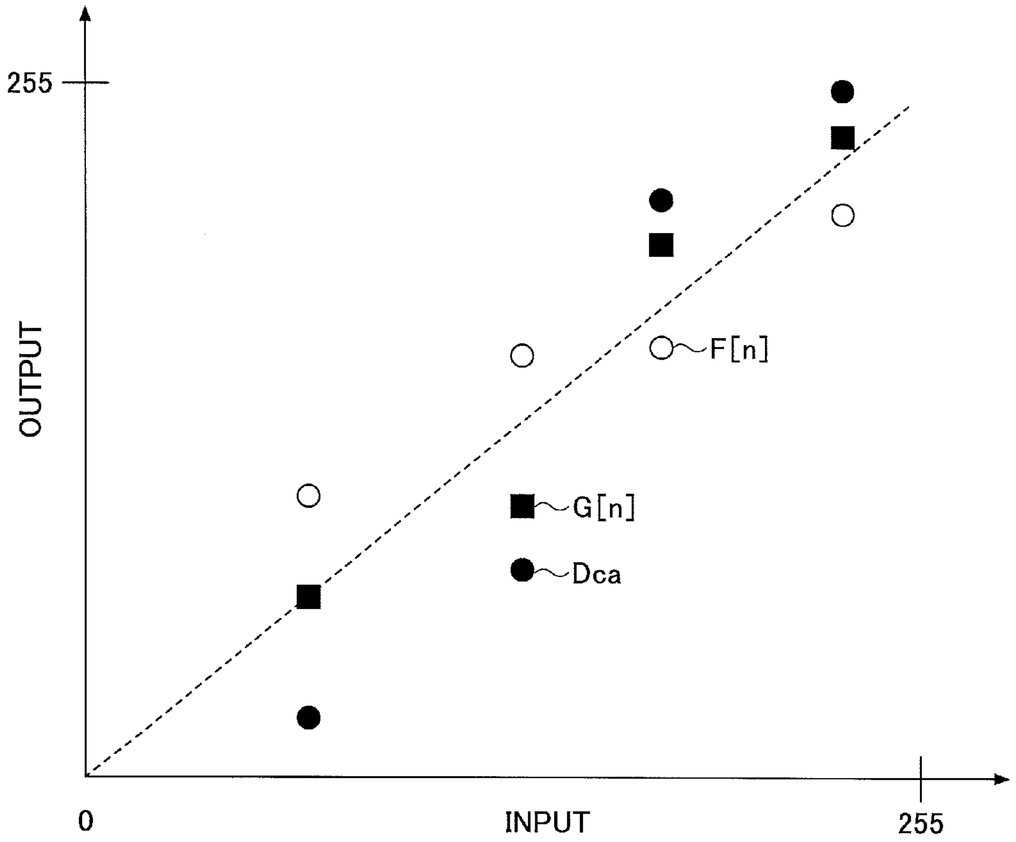
FIG. 14 is a graph illustrating operations performed by the image forming apparatus of the first specific embodiment for calculating intermediate transfer belt pattern characteristic-incorporated ACC gamma data.

In step S710, the image forming apparatus 110 uses the calculation unit 33 (image processing unit 30) to calculate the dual characteristics gamma data Dγat (control point (output) G[n]) based on the transfer characteristic (synthesis γ control point F[n]) calculated in step S708 and the image forming characteristic (ACC pattern characteristic Dca) calculated in step S305 of FIG. 3. For example, the image forming apparatus 110 may synthesize (calculate) control point (output) G[n] as illustrated in FIG. 14. Then, the image forming apparatus 110 stores the calculation result in the storage unit 50 and ends the process.

On the other hand, when the intermediate transfer belt pattern characteristic is not detected or is determined to be abnormal, in step S711, the image forming apparatus 110 uses the correction unit 32 to calculate the ACC gamma data Dγa (ACC characteristic γ) based only on the image forming characteristic (ACC pattern characteristic Dca) after which the image forming apparatus 110 ends the process.

It is noted that the image forming apparatus 110 of the present embodiment may achieve advantages similar to those achieved by the image forming apparatus 100.

Also, the image forming apparatus 110 of the present embodiment may correct a halftone intensity variation using a correction value (image processing parameter), for example. Further, because the image forming apparatus 110 of the present embodiment is configured to perform correction (linear interpolation) of a transfer characteristic (reference value Db) based on an image forming characteristic (reference value Dr), separate parameters for the image forming characteristic and the transfer characteristic may be unnecessary. In this way, the storage space used for calibration may be reduced.

Further, because the image forming apparatus 110 of the present embodiment uses the storage unit 50 to store the image forming characteristic and the transfer characteristic, the operation time of the image processing unit 30 (correction unit 32, calculation unit 33) may be reduced. That is, image formation productivity may be improved in the image forming apparatus 110 of the present embodiment.

Second Specific Embodiment

In the following, an image forming apparatus 120 according to a second specific embodiment is described.

The image forming apparatus 120 according to the second specific embodiment may have a configuration substantially identical to the image forming apparatus 100 as illustrated in FIG. 1. It is noted that features of the present embodiment that may be identical to those of the image forming apparatus 100 described above are omitted.

(Image Gradation Correction Operations)

In the following, image gradation correction operations performed by the image forming apparatus 120 upon activation are described with reference to FIG. 15. The image forming apparatus 120 of the present embodiment is configured to calculate a correction value (γ value) upon activation using a previous transfer characteristic (transfer pattern characteristic Dct) and a previous image forming characteristic (ACC pattern characteristic Dca) obtained right before shutting down operations of the image forming apparatus 120, for example.

It is noted that activation in the present embodiment refers to turning on the power of the image forming apparatus 120, restoring back to full function mode from power saving mode, or other instances in which operations of the image forming apparatus 120 are started.

Figure 15:
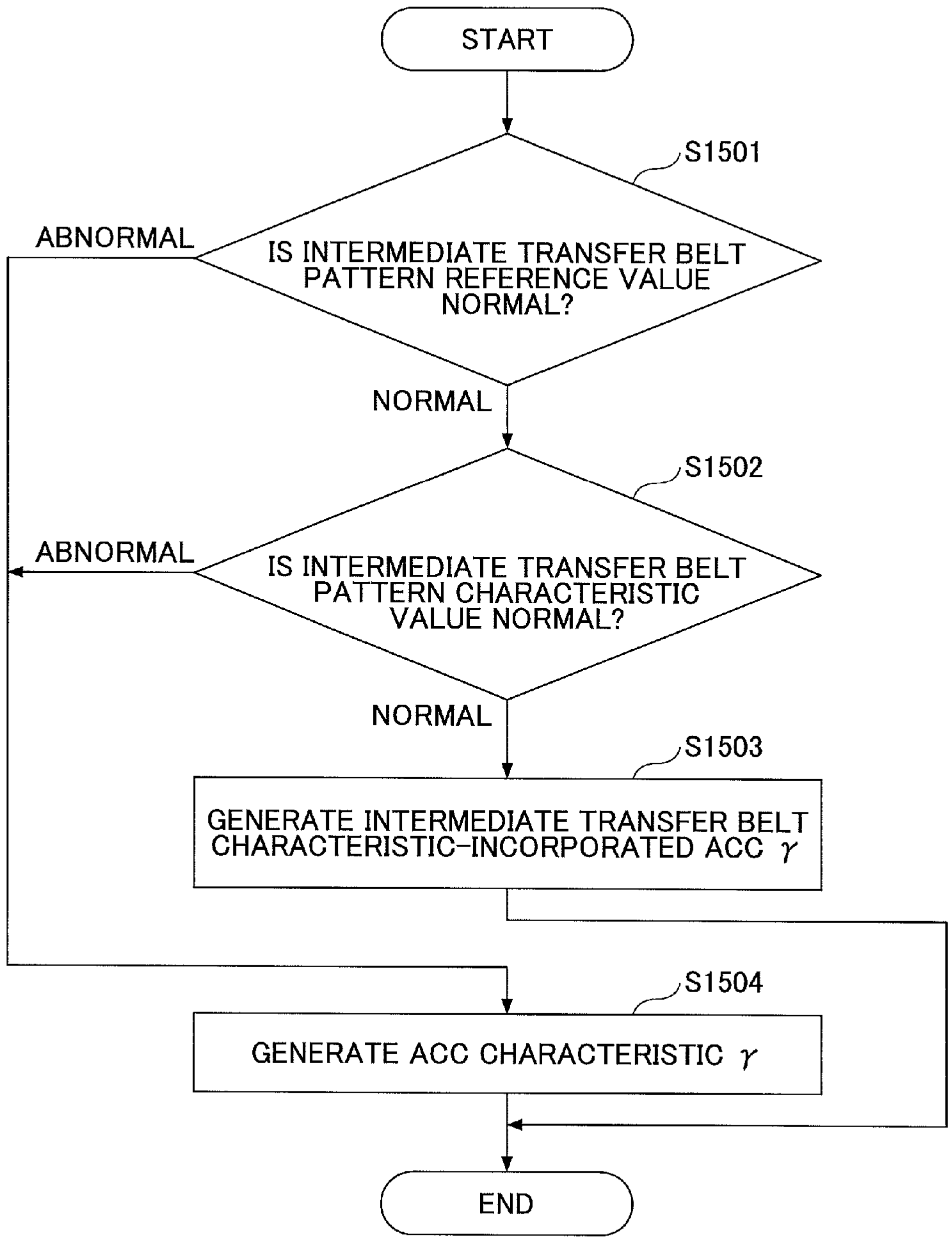
FIG. 15 is a flowchart illustrating exemplary operations performed by an image forming apparatus of a second specific embodiment upon activation.

As illustrated in FIG. 15, upon being activated, in step S1501, the image forming apparatus 120 of the present embodiment uses the determination unit 34 (image processing unit 30) to determine whether the reference value Db (intermediate transfer belt pattern reference value) stored in the storage unit 50 is normal. If it is determined that the reference value Db is normal, the image forming apparatus 120 proceeds to step S1502. If it is determined that the reference value Db is not normal, the image forming apparatus 120 proceeds to step S1504.

In step S1502, the image forming apparatus 120 uses the determination unit 34 (image processing unit 30) to determine whether the transfer pattern characteristic Dct (intermediate transfer belt pattern characteristic) stored in the storage unit 50 is normal. If the transfer pattern characteristic Dct is determined to be normal, the image forming apparatus 120 proceeds to step S1503. If the transfer pattern characteristic Dct is determined to be abnormal, the image forming apparatus 120 proceeds to step S1504.

In step S1503, the image forming apparatus 120 uses the correction unit 32 to calculate the dual characteristics gamma data Dγat (intermediate transfer belt pattern characteristic-incorporated ACC γ) based on the transfer characteristic (transfer pattern characteristic Dct) and the image forming characteristic (ACC pattern characteristic Dca). After calculating the dual characteristics gamma data Dγat, the image forming apparatus 120 ends the process.

On the other hand, when the reference value Db or the transfer pattern characteristic Dct is determined to be abnormal, in step S1504, the image forming apparatus 120 uses the correction unit 32 to calculate the ACC gamma data Dγa (ACC characteristic γ) based only on the image forming characteristic (ACC pattern characteristic Dca). After calculating the ACC gamma data Dγa, the image forming apparatus 120 ends the process.

It is noted that the image forming apparatus 120 of the present embodiment may achieve advantages similar to those achieved by the image forming apparatus 100.

Also, the image forming apparatus 120 of the present embodiment may determine a correction value (γ data) based on values detected right before shutting down operations of a previous process, for example. Additionally, when the reference value Db (step S1501) or the transfer pattern characteristic Dct (step S1502) is determined to be abnormal, the image forming apparatus 120 of the present embodiment may perform correction based only on the ACC pattern detection result without using the intermediate transfer belt pattern detection result. Further, when both the reference value Db (step S1501) and the transfer pattern characteristic Dct (step S1502) are determined to be normal, the image forming apparatus 120 of the present invention may perform correction based on a correction value (γ data) used right before shutting down operations of a previous process.

Although the present invention has been described above with reference to certain preferred embodiments, the present invention is not limited to these embodiments, and numerous variations and modifications may be made without departing from the scope of the present invention.

The present application is based on and claims the benefit of priority of Japanese Patent Application No. 2012-168506 filed on Jul. 30, 2012, the entire contents of which are hereby incorporated by reference.

What is claimed is:

1. An image forming apparatus that corrects a gradation of an image to be formed by detecting a gradation pattern, the image forming apparatus comprising:

an image forming unit configured to transfer a correction toner image corresponding to the gradation pattern on a surface of an intermediate transfer medium and to form a correction image corresponding to the gradation pattern on a surface of a recording medium;

a detection unit configured to detect the intensity of the correction toner image and the intensity of the correction image;

an image processing unit configured to correct the gradation based on at least one of the detected correction toner image or the detected correction image, wherein the image processing unit is configured to, calculate a transfer characteristic based on the intensity of the correction toner image detected by the detection unit, calculate an image forming characteristic based on the intensity of the correction image detected by the detection unit, and correct the gradation based on at least one of the calculated transfer characteristic or the calculated image forming characteristic such that, when a detection value corresponding to the correction toner image detected by the detection unit is less than or equal to a first threshold value or greater than or equal to a second threshold value, the image processing unit corrects the gradation based on a detection value corresponding to the correction image detected by the detection unit, and when a detection value corresponding to the correction toner image detected by the detection unit is not less than or equal to the first threshold value and is not greater than or equal to the second threshold value, the image processing unit corrects the gradation based on the detection value corresponding to the correction image detected by the detection unit and a detection value corresponding to the correction toner image detected by the detection unit.

2. The image forming apparatus as claimed in claim 1, wherein the image forming unit is configured to transfer a first pattern including a plurality of gradation values on the surface of the intermediate transfer medium as the correction toner image and configured to form a second pattern including a plurality of gradation values on the surface of the recording medium as the correction image.

3. The image forming apparatus as claimed in claim 1, wherein the image processing unit is configured to correct the transfer characteristic based on the calculated image forming characteristic.

4. The image forming apparatus as claimed in claim 1, further comprising:

a storage unit that stores a detection result detected by the detection unit;

wherein the image processing unit is configured to use the detection result stored in the storage unit to correct the gradation when the detection unit is unable to detect the correction toner image.

5. The image forming apparatus as claimed in claim 1, further comprising:

an interface unit configured to input information relating to correcting the gradation;

wherein the detection unit is configured to detect the correction toner image based on the information input to the interface unit; and the image processing unit is configured to correct the gradation based on the information input to the interface unit.

6. An image forming method comprising:

an image forming step performed upon calibration including transferring a correction toner image corresponding to a gradation pattern on a surface of an intermediate transfer medium and forming a correction image corresponding to the gradation pattern on a surface of a recording medium by transferring the correction toner image on the surface of the recording medium;

a detection step including detecting the intensity of the correction toner image transferred on the surface of the intermediate transfer medium and the intensity of the correction image formed on the surface of the recording medium; and an image processing step including correcting a gradation of an image to be formed based on at least one of the detected correction toner image or the detected correction image, wherein the image processing step includes, calculating a transfer characteristic based on the intensity of the correction toner image detected by the detection step, calculating an image forming characteristic based on the intensity of the correction image detected by the detection step, and correcting the gradation based on at least one of the calculated transfer characteristic or the calculated image forming characteristic, such that, when a detection value corresponding to the correction toner image detected in the detection step is less than or equal to a first threshold value or greater than or equal to a second threshold value, the image processing step includes correcting the gradation based on a detection value corresponding to the correction image detected in the detection step, and when a detection value corresponding to the correction toner image detected in the detection step is not less than or equal to the first threshold value and is not greater than or equal to the second threshold value, the image processing step includes correcting the gradation based on the detection value corresponding to the correction image detected in the detection step and a detection value corresponding to the correction toner image detected in the detection step.

7. The image forming method as claimed in claim 6, wherein the correction step includes performing a correction according to time degradation based on a comparison result of comparing the calculated image forming characteristic and the calculated transfer characteristic.

8. A non-transitory computer-readable medium having a program stored thereon that is executable by a computer, the program when executed causing the computer to perform an image forming method comprising:

an image forming step performed upon calibration including transferring a correction toner image corresponding to a gradation pattern on a surface of an intermediate transfer medium and forming a correction image corresponding to the gradation pattern on a surface of a recording medium by transferring the correction toner image on the surface of the recording medium;

a detection step including detecting the correction toner image transferred on the surface of the intermediate transfer medium and the correction image formed on the surface of the recording medium; and an image processing step including correcting a gradation of an image to be formed based on at least one of the detected correction toner image and the detected correction image, wherein the image processing step includes, calculating a transfer characteristic based on the intensity of the correction toner image detected by the detection step, calculating an image forming characteristic based on the intensity of the correction image detected by the detection step, and correcting the gradation based on at least one of the calculated transfer characteristic or the calculated image forming characteristic such that, when a detection value corresponding to the correction toner image detected by the detection unit is less than or equal to a first threshold value or greater than or equal to a second threshold value, the image processing step includes correcting the gradation based on a detection value corresponding to the correction image detected by the detection unit, and when a detection value corresponding to the correction toner image detected by the detection unit is not less than or equal to the first threshold value and is not greater than or equal to the second threshold value, the image processing step includes correcting the gradation based on the detection value corresponding to the correction image detected by the detection unit and a detection value corresponding to the correction toner image detected by the detection unit.

* * * * *